(12) United States Patent
Takahashi

(10) Patent No.: US 11,431,887 B2
(45) Date of Patent: Aug. 30, 2022

(54) INFORMATION PROCESSING DEVICE AND METHOD FOR DETECTION OF A SOUND IMAGE OBJECT

(71) Applicant: SONY CORPORATION, Tokyo (JP)

(72) Inventor: Naoya Takahashi, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,376

(22) PCT Filed: Jul. 10, 2019

(86) PCT No.: PCT/JP2019/027261
§ 371 (c)(1),
(2) Date: Jan. 13, 2021

(87) PCT Pub. No.: WO2020/022055
PCT Pub. Date: Jan. 30, 2020

(65) Prior Publication Data
US 2021/0281739 A1   Sep. 9, 2021

(30) Foreign Application Priority Data

Jul. 24, 2018   (JP) .............................. JP2018-138482

(51) Int. Cl.
*H04N 5/232* (2006.01)
*G03B 13/36* (2021.01)
*G03B 13/20* (2021.01)

(52) U.S. Cl.
CPC ......... *H04N 5/23212* (2013.01); *G03B 13/20* (2013.01); *G03B 13/36* (2013.01);
(Continued)

(58) Field of Classification Search
CPC .......... H04N 5/23212; H04N 5/23229; H04N 5/23296; H04N 5/23299; H04N 5/23218;
(Continued)

(56) References Cited

U.S. PATENT DOCUMENTS

2009/0228841 A1   9/2009 Hildreth
2011/0074812 A1   3/2011 Matsumoto et al.
(Continued)

FOREIGN PATENT DOCUMENTS

AU   2013263740 A1   10/2014
CN   102483767 A   5/2012
(Continued)

OTHER PUBLICATIONS

International Search Report and Written Opinion of PCT Application No. PCT/JP2019/027261 dated Oct. 1, 2019, 09 pages of ISRWO.
(Continued)

*Primary Examiner* — Padma Haliyur
(74) *Attorney, Agent, or Firm* — Chip Law Group

(57) ABSTRACT

Provided is an information processing device and a method that enable extraction of a desired object from a moving image with sound. The information processing device includes an image object detection unit that detects an image object on the basis of a moving image with sound, a sound object detection unit that detects a sound object on the basis of the moving image with sound, and a sound image object detection unit that detects a sound image object on the basis of a detection result of the image object and a detection result of the sound object.

15 Claims, 12 Drawing Sheets

(52) U.S. Cl.
CPC ..... *H04N 5/23229* (2013.01); *H04N 5/23296* (2013.01); *H04N 5/23299* (2018.08)

(58) Field of Classification Search
CPC .......... H04N 9/8211; H04N 5/232945; H04N 5/2628; H04N 5/23293; H04N 21/4394; H04N 21/44008; G03B 13/20; G03B 13/36; G11B 27/28; G11B 27/34; H04R 1/406; H04S 7/30; H04S 2400/11; H04S 2400/13; H04S 2400/15; H04S 2420/03; G06K 9/6293; G06N 3/08; G10L 21/0272; G10L 25/30; G10L 25/51; G10L 15/16; G10L 17/26
See application file for complete search history.

(56) References Cited

U.S. PATENT DOCUMENTS

| | | | |
|---|---|---|---|
| 2011/0122275 A1* | 5/2011 | Kawai | H04N 5/23232 348/222.1 |
| 2012/0170847 A1 | 7/2012 | Tsukidate | |
| 2012/0300022 A1 | 11/2012 | Kaneko | |
| 2013/0272548 A1 | 10/2013 | Visser et al. | |
| 2013/0342730 A1 | 12/2013 | Lee et al. | |
| 2013/0342731 A1 | 12/2013 | Lee et al. | |
| 2014/0085538 A1 | 3/2014 | Kaine et al. | |
| 2014/0314391 A1 | 10/2014 | Kim et al. | |
| 2016/0080684 A1 | 3/2016 | Farrell et al. | |
| 2017/0244928 A1* | 8/2017 | Miyajima | H04N 21/23418 |
| 2017/0289495 A1 | 10/2017 | Farrell et al. | |
| 2018/0054689 A1 | 2/2018 | Chen et al. | |
| 2020/0008004 A1 | 1/2020 | Eronen et al. | |
| 2020/0137491 A1* | 4/2020 | Hirose | G06K 9/00362 |
| 2020/0404444 A1 | 12/2020 | Eronen et al. | |

FOREIGN PATENT DOCUMENTS

| | | | |
|---|---|---|---|
| CN | 103516894 A | 1/2014 | |
| CN | 103516895 A | 1/2014 | |
| CN | 104065869 A | 9/2014 | |
| CN | 104246796 A | 12/2014 | |
| CN | 105592283 A | 5/2016 | |
| CN | 105989845 A | 10/2016 | |
| EP | 2680615 A1 | 1/2014 | |
| EP | 2680616 A1 | 1/2014 | |
| EP | 2782098 A2 | 9/2014 | |
| EP | 2836964 A1 | 2/2015 | |
| EP | 3262640 A1 | 1/2018 | |
| EP | 3549358 A1 | 10/2019 | |
| GB | 2557241 A | 6/2018 | |
| JP | 2011-076451 A | 4/2011 | |
| JP | 2011-517357 A | 6/2011 | |
| JP | 2014-50005 A | 3/2014 | |
| JP | 2014-194659 A | 10/2014 | |
| JP | 2015-514239 A | 5/2015 | |
| JP | 2015-177490 A | 10/2015 | |
| JP | 5917270 B2 | 5/2016 | |
| JP | 2018-077479 A | 5/2018 | |
| JP | 6518334 B2 | 5/2019 | |
| KR | 10-2014-0114238 A | 9/2014 | |
| KR | 10-2014-0145195 A | 12/2014 | |
| WO | 2009/111329 A2 | 9/2009 | |
| WO | 2012/004933 A1 | 1/2012 | |
| WO | 2013/154701 A1 | 10/2013 | |
| WO | WO-2016072120 A1 * | 5/2016 | ........... H04N 21/235 |
| WO | 2016/138168 A1 | 9/2016 | |
| WO | 2018/100244 A1 | 6/2018 | |
| WO | WO-2019044157 A1 * | 3/2019 | ............. H04R 1/406 |

OTHER PUBLICATIONS

Extended European Search Report of EP Application No. 19840800.7, dated Jul. 29, 2021, 08 pages.

* cited by examiner

INFORMATION PROCESSING DEVICE AND METHOD FOR DETECTION OF A SOUND IMAGE OBJECT

CROSS REFERENCE TO RELATED APPLICATIONS

This application is a U.S. National Phase of International Patent Application No. PCT/JP2019/027261 filed on Jul. 10, 2019, which claims priority benefit of Japanese Patent Application No. JP 2018-138482 filed in the Japan Patent Office on Jul. 24, 2018. Each of the above-referenced applications is hereby incorporated herein by reference in its entirety.

TECHNICAL FIELD

The present technology relates to an information processing device and method, and a program, and more particularly to an information processing device and method, and a program that enable extraction of a desired object from a moving image with sound.

BACKGROUND ART

If an object that emits sound can be extracted from a moving image with sound, which is a moving image accompanied by sound, the extraction result can be used for various processes, which is convenient.

For example, at a time of reproducing a moving image with sound, it is conceivable to focus on a certain object (body) on the moving image, or to enlarge or trim the object being a center. In such a case, there are demands for emphasizing sound emitted from an object that has undergone image processing such as focusing, enlarging, and trimming, or extract and play only that sound with respect to sound of the moving image with sound.

Furthermore, for example, as a technique for emphasizing a desired sound, a technique for emphasizing a sound in a certain direction of an object (body) using a microphone array has been proposed (see, for example, Patent Document 1).

CITATION LIST

Patent Document

Patent Document 1: Japanese Patent Application Laid-Open No. 2014-50005

SUMMARY OF THE INVENTION

Problems to be Solved by the Invention

However, it has been difficult to extract an image area and sound of a desired object from the moving image with sound by the above-mentioned technique.

For example, in the technique described in Patent Document 1, in a case where there is a plurality of bodies that emits sound in the same direction in space, it is not possible to focus sound on a desired body. That is, it is not possible to extract only sound of the desired body from a plurality of bodies (objects) in the same direction.

Furthermore, because the technique described in Patent Document 1 approximates selection of a body by selecting a position on a moving image, it is not possible to select an object based on a concept such as a person A, a car, or a guitar. For example, even if the user desires to give an instruction to "focus on a girl in a red shirt" or the like in a voice recognition interface, unless the girl in the red shirt is defined as an object and the image area and sound corresponding to that object are defined, it is difficult to respond to such commands.

Therefore, it has not been possible to focus on an object that emits a specific sound, such as focusing on an object on the basis of a sound of this object, for example.

The present technology has been made in view of such a situation, and makes it possible to extract a desired object from a moving image with sound.

Solutions to Problems

An information processing device of one aspect of the present technology includes an image object detection unit that detects an image object on the basis of a moving image with sound, a sound object detection unit that detects a sound object on the basis of the moving image with sound, and a sound image object detection unit that detects a sound image object on the basis of a detection result of the image object and a detection result of the sound object.

An information processing method or a program of one aspect of the present technology includes the steps of detecting an image object on the basis of a moving image with sound, detecting a sound object on the basis of the moving image with sound, and detecting a sound image object on the basis of a detection result of the image object and a detection result of the sound object.

In one aspect of the present technology, an image object is detected on the basis of a moving image with sound, a sound object is detected on the basis of the moving image with sound, and a sound image object is detected on the basis of a detection result of the image object and a detection result of the sound object.

Effects of the Invention

According to one aspect of the present technology, a desired object can be extracted from a moving image with sound.

Note that the effect described here is not necessarily limited, and may be any effect described in the present disclosure.

MODE FOR CARRYING OUT THE INVENTION

Figure 1:
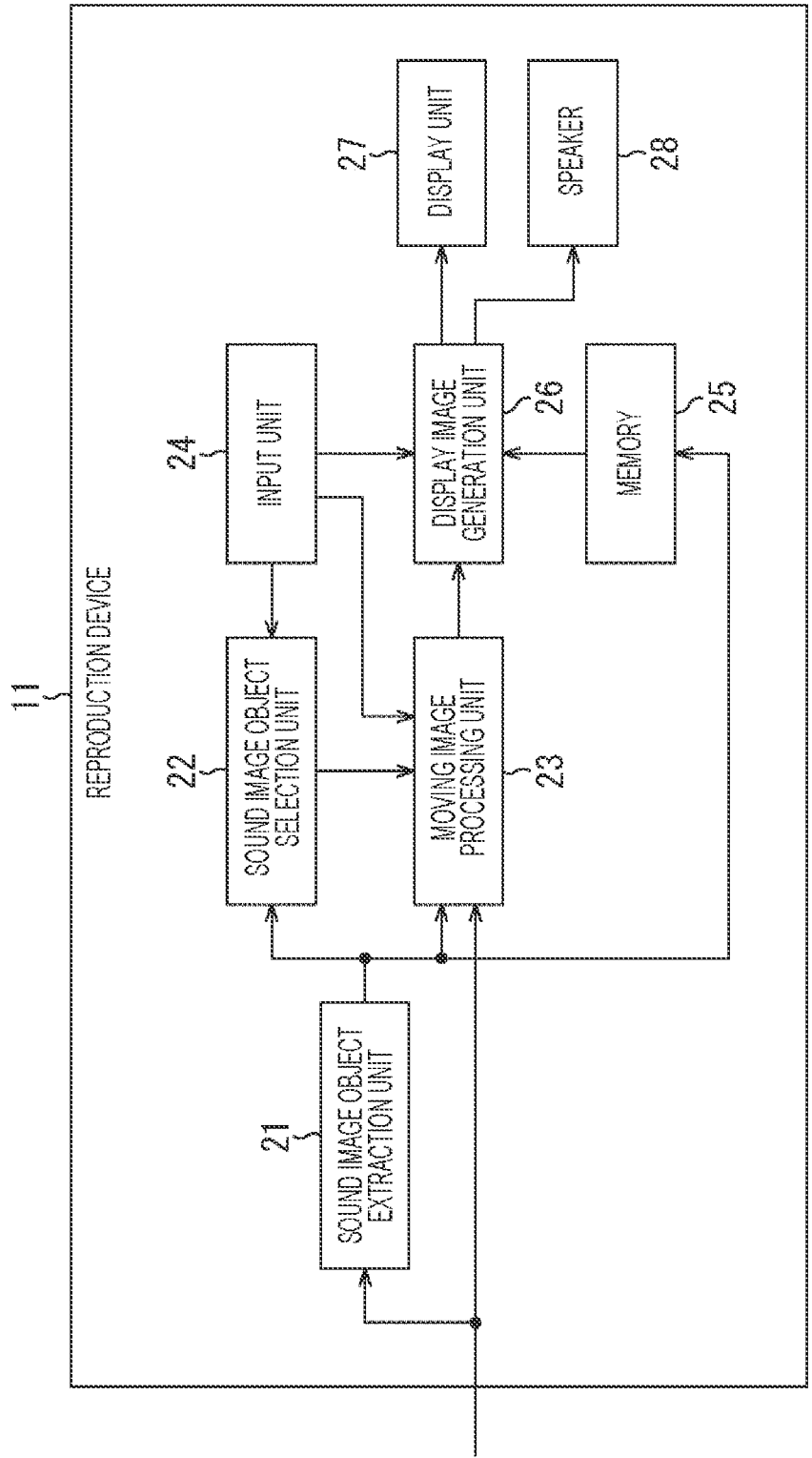
FIG. 1 is a diagram illustrating a configuration example of a reproduction device.

Hereinafter, embodiments to which the present technology is applied will be described with reference to the drawings.

First Embodiment

About Present Technology

The present technology detects a sound object and an image object from a moving image with sound, and detects a sound image object on the basis of detection results thereof, to thereby enable extraction of an image area and a sound of a desired object, that is, the sound image object, from the moving image with sound.

Here, the moving image with sound includes a moving image and sound accompanying the moving image. In the following, the moving image constituting the moving image with sound will be simply referred to as a moving image with sound. Furthermore, the sound object is an object such as a body that becomes a sound source of the sound of the moving image with sound, and the image object is an object such as a body that is present as a subject on the moving image with sound. Furthermore, the sound image object is an object that is both the sound object and the image object of the moving image with sound.

In the present technology, when the sound image object is detected, the image object and the sound object are first detected individually.

At this time, for detection of the image object, sound information of the moving image with sound, such as a detection result of the sound object and a detection result of an acoustic event, can be appropriately used. In this manner, the image object can be detected even in a situation where the moving image constituting the moving image with sound is dark, brightness is insufficient, a subject is unclear, or most of the subject is hidden, or the like.

Furthermore, sound source separation is used to detect the sound object. Thus, even if there is a plurality of sound sources in one direction, respective sounds of sound sources can be separated according to the types of sound sources. That is, the sound object can be detected and extracted more reliably.

Note that although an example in which the sound source separation is used to detect the sound object will be described here, a technique for detecting a sound source direction such as directivity control using a microphone array may be combined, for example.

However, directivity control cannot simply be substituted for the sound source separation. This is because the sound source separation requires prior knowledge of what kinds of sound sources of sounds to be separated and extracted and models for their sound sources, and in order to build the models, information more than volume difference, phase difference, and acoustic feature amount, that is, more information is also required.

Moreover, image information such as a detection result of the image object may be used when the sound object is detected. For example, by using the detection result of the image object, it is possible to narrow down the direction in which the sound source (sound object) is located and the type of sound source and the like when the sound object is detected.

In addition, a simultaneous occurrence probability of the image object and the sound object may be used to detect the image object and the sound object. In such a case, for example, when a predetermined image object exists, the probability that a plurality of respective sound objects is monitored simultaneously, that is, a model for estimating the simultaneous occurrence probability is learned in advance, and the simultaneous occurrence probability is used for narrowing down the sound object as a detection target.

If the image object and the sound object are detected, the sound image object is detected on the basis of detection results thereof.

Specifically, in the present technology, the sound image object is detected by associating the detected image object and sound object.

In the association of the image object and the sound object, for example, by using the prior knowledge of the image object and the sound object and the position information in space, or the like, the image object and the sound object at each position can be correctly associated with each other according to the position information. Furthermore, in the association of the image object with the sound object, it is possible to individually turn the sound sources in the same direction into objects.

Specifically, for example, a neural network or the like obtained by learning can be prepared in advance, and the sound object and the image object can be associated with each other by the neural network or the like.

At this time, for example, the image object corresponding to the position of the sound object is labeled (associated) from the prior knowledge (preliminary information) of the sound object, or conversely, from the prior knowledge of the image object, the sound object corresponding to the position of the image object is labeled (associated).

In addition, co-occurrence probability of the image object and the sound object may be learned in advance, and the co-occurrence probability may be used for detecting the sound image object.

If one or a plurality of sound image objects is detected as described above, it is possible to select any one of the sound image objects and perform control to execute a process based on the selected sound image object.

The method of selecting the sound image object may be specified by the user or may be automatically selected by the device side.

For example, in a case where the user selects (specifies) the sound image object, the user can select a desired sound image object in sound image object units by input operation using an input operation device such as a mouse or voice input using voice recognition.

Furthermore, in virtual reality (VR), augmented reality (AR), mixed reality (MR), or the like, a predetermined sound image object registered in advance may be selected. In this case, for example, the sound image object corresponding to a human voice, a specific acoustic event, a specific body (object), or the like is selected.

In addition, in the VR, AR, MR, or the like, a gaze position of the user may be detected and the sound image object at the gaze position may be selected, or the sound image object that is in focus by auto focus (AF) in a camera or the like may be selected.

Furthermore, the process based on the selected sound image object may be any process, and a focus process, a removal process, a notification process, a shutter operation control process, and the like are conceivable.

For example, in the focus process, an emphasis process, image synthesis, or the like can be performed so that the image area of the selected sound image object is focused in an AR or a light field camera, and at the same time, sound of the selected sound image object can be emphasized.

Furthermore, for example, in the removal process, the selected sound image object can be removed from the moving image with sound, such as erasing a specific person in AR, and sound of the sound image object can also be removed.

Further, in the notification process, for example, in AR, it is possible to notify the user that the selected sound image object is a noteworthy object. In addition, in the shutter operation control process, the camera can be controlled to perform a shutter operation to capture an image when the selected sound image object emits a characteristic sound.

Configuration Example of Reproduction Device

Now, the above-described present technology will be described in more detail below.

FIG. 1 is a diagram illustrating a configuration example of one embodiment of a reproduction device to which the present technology is applied.

The reproduction device 11 illustrated in FIG. 1 is formed by, for example, an information processing device capable of processing the moving image with sound, such as a personal computer, a head-mounted display, a game device, a smartphone, a camera, a smart speaker, and a robot.

The reproduction device 11 has a sound image object extraction unit 21, a sound image object selection unit 22, a moving image processing unit 23, an input unit 24, a memory 25, a display image generation unit 26, a display unit 27, and a speaker 28.

The sound image object extraction unit 21 extracts the sound image object from the moving image with sound by detecting the sound image object from the supplied moving image with sound, and supplies an extraction result thereof to the sound image object selection unit 22, the moving image processing unit 23, and the memory 25.

Here, as the extraction result of the sound image object, sound image object information of each sound image object is output, for example, for every frame of the moving image with sound. This sound image object information includes, for example, image area information, separated sound, type information, and the like.

The image area information is an image area of the sound image object on the moving image with sound, that is, an image of the sound image object, and the separated sound is sound of the sound image object, more specifically, a sound signal of the sound of the sound image object. Furthermore, the type information is information indicating the type (kind) of the sound image object.

Generally, sounds emitted from a plurality of sound sources (objects) are mixed and monitored from the sound of the moving image with sound, but in the sound image object extraction unit 21, only sound of the sound image object as the target is separated (extracted) and output as a separated sound.

The sound image object selection unit 22 selects, on the basis of the extraction result of the sound image object supplied from the sound image object extraction unit 21 according to a signal supplied from the input unit 24, one or a plurality of desired sound image objects from one or a plurality of extracted sound image objects, and supplies a selection result thereof to the moving image processing unit 23.

The moving image processing unit 23 performs a process based on the sound image object on the moving image with sound supplied from the outside according to the signal supplied from the input unit 24, the selection result supplied from the sound image object selection unit 22, and the extraction result supplied from the sound image object extraction unit 21.

In a case where image processing is performed as the process based on the sound image object, the moving image processing unit 23 supplies the moving image with sound after the image processing to the display image generation unit 26.

Furthermore, for example, in a case where the reproduction device 11 is a device having an imaging function such as a camera, the moving image processing unit 23 may perform the above-mentioned shutter operation control process or the like as the process based on the sound image object.

The input unit 24 includes, for example, various input devices such as buttons and switches, a touch panel provided superimposed on the display unit 27, and a microphone used for voice recognition. The input unit 24 supplies a signal according to a user operation, a voice input, and the like to the sound image object selection unit 22, the moving image processing unit 23, and the display image generation unit 26.

The memory 25 temporarily holds the extraction result supplied from the sound image object extraction unit 21, and appropriately supplies the held extraction result to the display image generation unit 26.

The display image generation unit 26 generates, according to the signal supplied from the input unit 24, a display image and a reproduction sound, which are an image and sound for reproduction on the basis of the extraction result held in the memory 25 and the moving image with sound after image processing supplied from the moving image processing unit 23.

The display image generation unit 26 supplies the generated display image, more specifically, the image data of the display image to the display unit 27 to display the display image, and at the same time, the generated reproduction sound, more specifically, the sound data of the reproduction sound is supplied to the speaker 28 to reproduce (output) the reproduction sound.

The display unit 27 includes, for example, a liquid crystal display panel or the like, and displays a display image supplied from the display image generation unit 26. The speaker 28 outputs the reproduction sound supplied from the display image generation unit 26.

Configuration Example of Sound Image Object Extraction Unit

Figure 2:
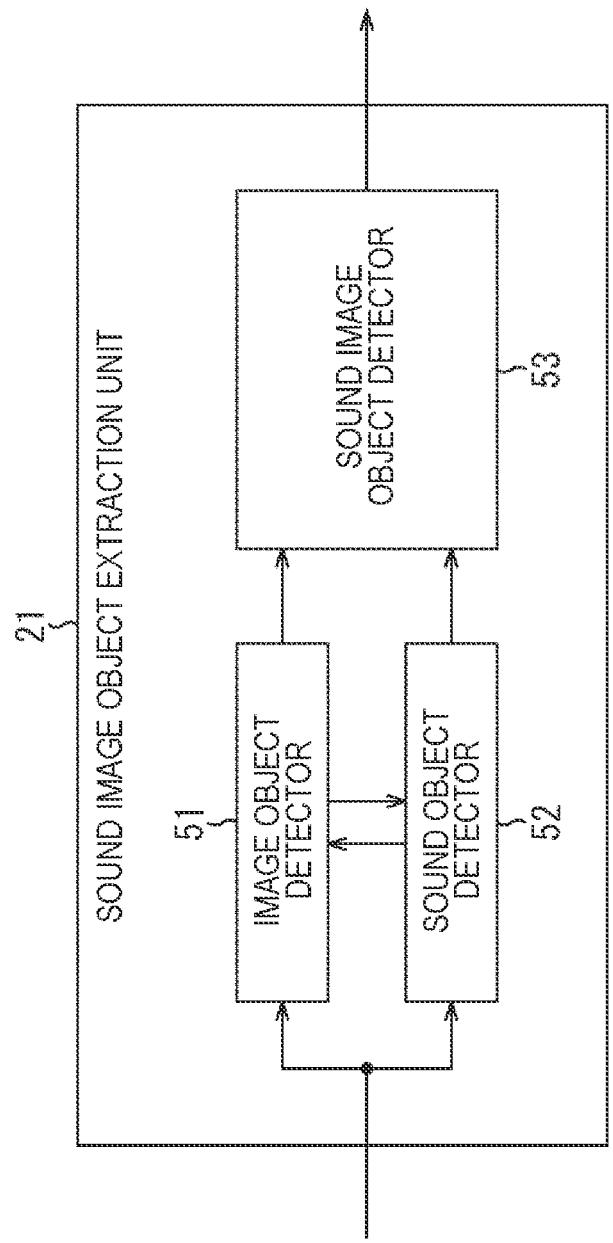
FIG. 2 is a diagram illustrating a configuration example of a sound image object extraction unit.

Furthermore, the sound image object extraction unit 21 in the reproduction device 11 is configured as illustrated in FIG. 2, for example.

In the example illustrated in FIG. 2, the sound image object extraction unit 21 has an image object detector 51, a sound object detector 52, and a sound image object detector 53.

The image object detector 51 detects an image object from an externally supplied moving image with sound by appropriately using a detection result of an acoustic event or a sound object supplied from the sound object detector 52.

That is, the image object detector 51 detects an image area of the image object from the moving image constituting the moving image with sound.

The image object detector 51 supplies the detection result of the image object to the sound object detector 52 and the sound image object detector 53. Note that in detection of the image object by the image object detector 51, not only the moving image constituting the moving image with sound but also the sound constituting the moving image with sound may be used.

The sound object detector 52 appropriately uses the detection result of the image object supplied from the image object detector 51 to detect a sound object from the moving image with sound supplied from the outside, and supplies the detection result to the sound image object detector 53. For detection of the sound object, not only sound of the moving image with sound but also moving image constituting the moving image with sound is appropriately used.

Furthermore, the sound object detector 52 also detects an acoustic event from the moving image with sound. The sound object detector 52 appropriately supplies detection results of the sound object and the acoustic event to the image object detector 51.

Note that more specifically, in the sound object detector 52, sound (separated sound) of the detected sound object is extracted from sound of the moving image with sound by detecting the sound object.

The sound image object detector 53 detects the sound image object on the basis of the detection result supplied from the image object detector 51 and the detection result supplied from the sound object detector 52. Here, the sound image object is detected by associating the image object with the sound object.

Furthermore, the sound image object detector 53 generates the sound image object information of the detected sound image object from the detection result of the image object and the detection result of the sound object, thereby extracting the sound image object from the moving image with sound. The sound image object detector 53 supplies the sound image object information obtained as a result of extracting the sound image object to the sound image object selection unit 22, the moving image processing unit 23, and the memory 25.

Note that the sound image object is an object that is both the image object and the sound object. However, what is an image object but not a sound object in a predetermined frame may be assumed as a silent sound image object.

That is, also in a case where there is no corresponding sound object in the current frame for an image object that is regarded as the sound image object in the past frame, the image object may be regarded as the silent sound image object in the current frame.

This is because, for example, the image object in which the corresponding sound object is not detected in a predetermined frame but the corresponding sound object is detected in the past frame also needs to be treated as a sound image object. Note that it is possible to identify which image objects correspond to each other among a plurality of frames by tracking or the like.

Similarly, in a frame with the sound image object, it may be hidden by some kind of shield or the like and disappear. Accordingly, regarding the sound object that is assumed as the sound image object in the past frame, the sound object may be regarded as the sound image object in the current frame even in a case where there is no corresponding image object in the current frame.

In addition, an image object without a corresponding sound object or a sound object without a corresponding image object may be classified as a background image or a background sound object, that is, a background object.

Furthermore, an example in which the sound image object detector 53 detects the sound image object on the basis of the detection result of the image object and the detection result of the sound object has been described in FIG. 2, but it is also possible to configure the sound image object detector 53 to detect the sound image object using the moving image with sound as an input.

However, rather than detecting the sound image object with the sound image object detector 53 by inputting the moving image with sound, it is possible to detect the sound image object with high accuracy by providing the image object detector 51 and the sound object detector 52 in front of the sound image object detector 53 as illustrated in the example of FIG. 2.

Configuration Example of Sound Object Detector

Figure 3:
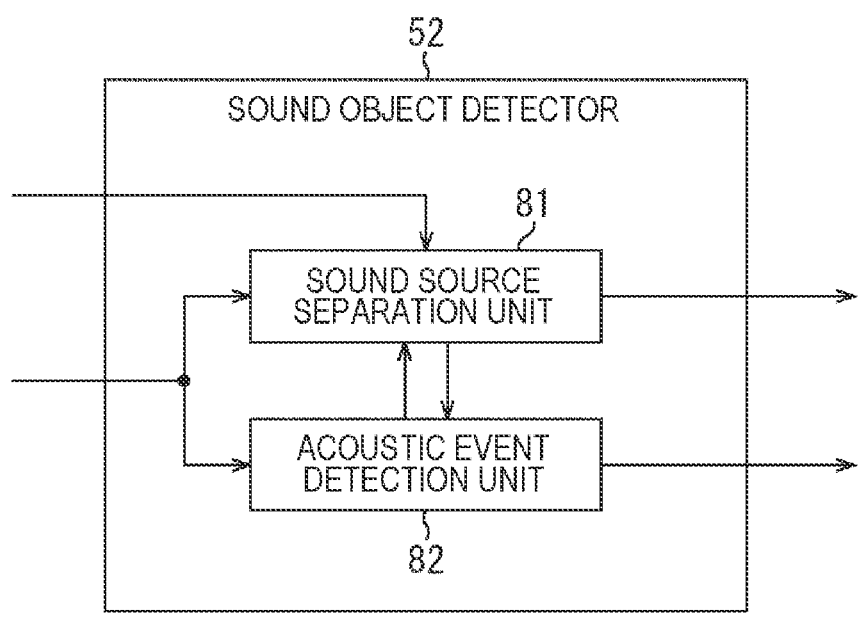
FIG. 3 is a diagram illustrating a configuration example of a sound object detector.

Moreover, the sound object detector 52 is configured as illustrated in FIG. 3, for example.

In the example illustrated in FIG. 3, the sound object detector 52 has a sound source separation unit 81 and an acoustic event detection unit 82.

The sound source separation unit 81 detects the sound object by sound source separation on the basis of sound of the moving image with sound supplied from the outside by appropriately using the detection result supplied from the image object detector 51 and a detection result of acoustic event supplied from the acoustic event detection unit 82. The sound source separation unit 81 supplies the detection result of the sound object to the acoustic event detection unit 82 and the sound image object detector 53. Note that the detection result of the sound object may also be supplied to the image object detector 51.

The acoustic event detection unit 82 detects a specific acoustic event from sound of the moving image with sound supplied from the outside by appropriately using the detection result supplied from the sound source separation unit 81, and supplies a detection result thereof to the sound source separation unit 81 and the image object detector 51.

About Operation of Respective Units of Reproduction Device

Next, operation of respective units of the reproduction device 11 described above will be described in more detail.

First, the sound source separation unit 81 and the acoustic event detection unit 82 will be described.

For example, the sound source separation unit 81 can be constructed by the neural network.

Generally, sound recorded by a microphone is a mixture of sounds emitted from a plurality of sound sources. That is, in a state that the sounds from the plurality of sound sources are mixed, the microphone monitors the sounds from the respective sound sources. Accordingly, in order to extract a sound object, a sound source separation technique for separating only the sound of the target sound object from the mixed sound is required.

Therefore, in the sound source separation unit 81, the sound source separation is performed by using the technology described in, for example, "Multi-scale Multi-band DenseNets for Audio Source Separation, WASPAA 2017" (hereinafter referred to as "Technical Document 1") or the like, so as to detect and extract sound of the sound object.

That is, in a case where the sound source separation unit 81 is configured by a neural network, the desired object to be finally detected is a sound object as a detection target (extraction target) in the sound source separation. Furthermore, sound data including sound of the sound object as a detection target and other voices that can be monitored at the same time is prepared in advance as data for learning by the neural network.

Then, using such sound data for learning, the learning by the neural network is performed so as to estimate sound of the target object as sound of the sound object from the mixed sounds. Particularly during learning, the neural network learns so as to minimize an estimation square error of an amplitude spectrum in a frequency domain.

In the neural network, it is conceivable that separation performance decreases as the types of objects as detection targets increase. This is because confusion occurs among objects having similar acoustic characteristics, and output destinations are dispersed.

In order to prevent occurrence of such confusion, image information may be used for sound source separation in the neural network that functions as the sound source separation unit 81. Here, the image information may be the moving image with sound itself, or may be a result of image body recognition for the moving image with sound, a detection result of the image object, or the like.

For example, by using an image body recognition result for the moving image constituting the moving image with sound as the image information, types of candidate sound objects can be narrowed down in advance, and the sound source separation can be performed with higher accuracy.

Furthermore, for example, in a case where there is a plurality of microphones and sound of the moving image with sound becomes sound of a plurality of channels, a sound source position estimation result by sound and an image body position estimation result by image may be verified, so as to narrow down the sound object in every direction.

Specifically, for example, an index indicating the type of the object (sound object) as a detection target is denoted by i (where i=N), and the existence probability of the i-th object obtained as a detection result of an object by an image body recognizer is denoted by $p_i$.

In this case, it is only required to perform sound source separation by only limiting to a set O of objects=$\{i|p_i>th\}$ having an existence probability $p_i$ that is equal to or higher than a predetermined threshold th or a set O' of upper M objects having a high existence probability $p_i$ in the neural network constituting the sound source separation unit 81.

Therefore, in this case, the sound object detector 52 is provided with an image body recognizer that is not illustrated, and that uses the moving image with sound as an input and detects the image area of each of the N objects from the moving image with sound.

Then, the sound source separation unit 81 uses the existence probability $p_i$, which is an output of the image body recognizer, and sound of the moving image with sound as inputs, and takes only a sound object belonging to the set O or the set O' as a detection target, so as to detect the sound object from the sound of the moving image with sound.

In this case, the sound source separation unit 81 performs narrowing down of objects based on the type of the sound object when the sound object is detected so that only an object existing as a subject on the moving image with sound is taken as the detection target.

Note that it is also possible to use the output of the image object detector 51 instead of the existence probability $p_i$ that is the output of the image body recognizer. In this case, the sound source separation unit 81 uses at least the detection result of the image object by the image object detector 51 and the sound of the moving image with sound as inputs, so as to detect (extract) the sound object by sound source separation.

In addition, in a case where the output of the image object detector 51 is used to detect the sound object, for example, in the neural network constituting the sound source separation unit 81, the existence probability of the sound object corresponding to the image object detected by the image object detector 51 may be increased. Moreover, in this case, the existence probability of the sound object corresponding to an undetected image object may be significantly reduced.

Furthermore, in a case where the sound of the moving image with sound has a plurality of channels, it is possible to narrow down the candidates for the sound object in every direction.

In this case, the position of the image object (body) obtained as a detection result by the image body recognizer or the image object detector 51, that is, the direction in which the image object exists, the existence probability $p_i$ of the image object at that position, and the sound of the moving image with sound are input to the sound source separation unit 81.

In the sound source separation unit 81, the position of the sound source, which is a candidate for the sound object, that is, the direction of the sound source can be obtained by estimation from the sound of the input moving image with sound. Thus, in the sound source separation unit 81, for every direction of the sound source, only the object belonging to the set O or the set O' about the existence probability $p_i$ of the image object in the direction of the sound source is taken as the detection target, so as to detect the sound object. In other words, the direction in which the image object is present and the direction in which the sound source is present are verified, and from the detection result of the image object, only an object that is likely to exist in the direction in which the sound source is present is taken as the detection target.

In this case, the sound objects as the detection target are narrowed down on the basis of the position of the image object on the moving image constituting the moving image with sound, that is, an image body position by image body recognition or the like, and the position of the sound source to be the sound object.

Moreover, there is a possibility that the sound emitted from a body that is not present as a subject on the moving image with sound is collected and included in the sound of the moving image with sound.

In such a case, for the output of the image body recognizer or the image object detector 51, that is, the detected image object (body), it is only required to learn in advance a model for estimating the simultaneous occurrence probability $q_j$ of a plurality of sound objects that is simultaneously monitored when the image object exists.

Then, the sound source separation unit 81 can also use the simultaneous occurrence probability $q_j$ as an input and narrow down the sound objects as the detection target on the basis of the simultaneous occurrence probability $q_j$.

In this case, the model for estimating the simultaneous occurrence probability $q_j$ that is not illustrated constituted of, for example, the neural network or the like is provided in the sound object detector 52. Then, for example, the model uses the detection result of the image object as an input to estimate the simultaneous occurrence probability $q_j$ of a plurality of sound objects, and supplies the simultaneous occurrence probability $q_j$ obtained as a result to the sound source separation unit 81.

The sound source separation unit 81 uses the existence probability $p_i$ as the detection result of the image object detector 51, the sound of the moving image with sound, and the simultaneous occurrence probability $q_j$ supplied from the model as inputs, so as to detect the sound object by the sound source separation.

At this time, when the sound object is detected, an object having a high simultaneous occurrence probability $q_j$ is added to the set O or the set O', and an object having a low simultaneous occurrence probability $q_j$ is excluded from the set O or the set O'. Thus, the sound objects as the detection target are narrowed down based on the simultaneous occurrence probability $q_j$, which is the probability that the plurality of sound objects exists at the same time.

Furthermore, in a case where there is a plurality of sound objects of the same type and these sound objects emit sound at the same time, a method of performing the sound source separation depending only on the type of the object as in Technical Document 1 described above cannot separate sounds of a plurality of sound objects of the same type.

Accordingly, for example, the sound source separation unit 81 may be configured by beamforming using localization information indicating a localization position of a sound image, sound source independence, sparseness in the frequency domain, and the like, independent component analysis, clustering-based method, a neural network or the like obtained by permutation-free learning, or the like. Note that the image information can be used as the localization information.

Furthermore, the acoustic event detection unit 82 includes, for example, the neural network or the like, detects a specific acoustic event from the sound of the supplied moving image with sound, and supplies acoustic event information as a detection result thereof to the image object detector 51 and the sound source separation unit 81.

Here, for example, human voice, bark of animal such as a dog, or predetermined music is detected as the specific acoustic event, and information including a posterior probability of occurrence of the acoustic event is output as the acoustic event information. Note that the acoustic event information may include direction information indicating the direction in which the acoustic event has occurred, or the like.

As described above, the sound source separation unit 81 and the acoustic event detection unit 82 can mutually use detection results.

For example, in the sound source separation unit 81, the posterior probability included in the acoustic event information is also used as an input to the neural network for sound source separation, and the sound source separation is performed so that the sound object corresponding to the acoustic event for which the input posterior probability is high can be easily detected. In this case, it can be said that the sound source separation unit 81 detects the sound object by detecting the acoustic event.

On the other hand, in the acoustic event detection unit 82, the detection result of the sound object supplied from the sound source separation unit 81 and the sound of the moving image with sound are used as inputs, and the acoustic event is detected so that the posterior probability of the acoustic event corresponding to the detected sound object is high.

Subsequently, the image object detector 51 will be described.

The image object detector 51 can be constructed by, for example, the neural network, and a body detection technique, a segmentation technique, or the like can be used to construct the image object detector 51.

Note that the body detection technique is described in detail in, for example, "You Only Look Once: Unified, Real-Time Object Detection, CVPR 2016" (hereinafter referred to as Technical Document 2). Furthermore, the segmentation technique is described in detail in, for example, "One-Shot Video Object Segmentation, CVPR 2017" (hereinafter referred to as "Technical Document 3").

Moreover, in the image object detector 51, the sound of the moving image with sound, the acoustic event information supplied from the acoustic event detection unit 82, and the detection result of the sound object obtained by the sound source separation unit 81 may be used as inputs so that the image object can be detected with high performance even when a subject on the moving image with sound is unclear.

For example, there is a case where it is desired to detect a dog as the image object from the moving image with sound, but the dog moves violently and the dog image on the moving image with sound is unclear.

However, even in such a case, it is possible to obtain information that the dog is included as a subject in the moving image with sound with a high probability from the detection result of the sound object and the information of dog bark supplied as the acoustic event information. Then, by using such information, the detection accuracy of the dog as the image object can be improved.

Use of such information can be achieved by giving the sound of the moving image with sound, the detection result of the sound object, the acoustic event information, and the like as inputs when the neural network constituting the image object detector 51 learns, and causing the neural network to learn.

In this case, at the time of detecting the image object, not only the moving image of the moving image with sound but also the detection result of the sound and the sound object of the moving image with sound, the acoustic event information, and the like are also input to the neural network constituting the image object detector 51.

In the image object detector 51, as in the case of the sound source separation unit 81, it is possible to narrow down the image object as the detection target based on the object type, the sound source position, the image body position, the simultaneous occurrence probability, and the like by using the detection result of the sound object, the acoustic event information, and the like.

Furthermore, the sound image object detector 53 detects the sound image object on the basis of the detection result of the image object and the detection result of the sound object.

Here, the detection of the sound image object is equivalent to the process of associating the image object detected by the image object detector 51 with the sound object detected by the sound object detector 52.

For example, the image object detector 51 outputs the image object information as the detection result of the image object, that is, the extraction result of the image object. The image object information includes, for example, the image area information and image type information.

Here, the image area information is an image (video) of the image object in the moving image with sound, that is, an image of an image area where the image object exists. Furthermore, the image type information is information indicating the image area information, that is, the type of the image object existing in the image area, and for example, the image type information is the existence probability $p_i^V$ of an image object having an index i in the image area, and the like. In addition, the image object information may include the position of the image area information, that is, the image object position information indicating the position (direction) of the image object.

Furthermore, for example, the sound source separation unit 81 outputs sound object information as the detection result of the sound object, that is, the extraction result of the sound object. This sound object information includes the sound of the sound object (separated sound) extracted from the moving image with sound and sound type information indicating the type of the sound object of the separated sound. For example, the sound type information is a probability (identification probability) piA that the separated sound is sound of a sound object having an index i, or the like. In addition, the sound object information may also include sound object direction information indicating a certain direction (position) of the sound object.

For example, the sound image object detector 53 is the neural network that takes the image object information and the sound object information as inputs, and outputs a probability that the detected image object and sound object are the same object (body) on the basis of the image object information and the sound object information. Here, the probability that the image object and the sound object are the same object is the co-occurrence probability of the image object and the sound object.

That is, in the neural network constituting the sound image object detector 53, for example, determines whether the detected image object and the sound object match using the image type information, the sound type information, the image object position information, the sound object direction information, information regarding movement of an image object obtained from the time-series image object position information, and the like.

The neural network constituting such a sound image object detector 53 may learn using a data set of the moving image with sound in which an image object and a sound object are associated with each other in advance by a person. Furthermore, the neural network constituting the sound image object detector 53 may learn using data automatically labeled by a learning device or the like, that is, a data set of the moving image with sound in which the image object and the sound object are associated with each other by the learning device or the like.

The sound image object detector 53 obtains the co-occurrence probability that the image object and the sound object match for all combinations or part of combinations of the image object and the sound object.

Then, the sound image object detector 53 associates the image object with the sound object in descending order of the obtained co-occurrence probability, and the associated image object and the sound object are assumed as the same sound image object.

Furthermore, the sound image object detector 53 determines the type of the associated image object and sound object, that is, the sound image object on the basis of the existence probability $p_i^V$ of the associated image object and the identification probability $p_i^A$ of the sound object.

Here, it is assumed that definitions of the image object, the sound object, and the sound image object are the same. Note that the definition being the same means that, for example, the index i indicating the type of the image object and the index i indicating the type of the sound object both indicate the same type of object.

Specifically, for example, it is assumed that the type of image object is "person", and the type of sound object is "sound of human handclap", "speaking voice of person", or the like. In this case, the definition of the image object type "person" and the sound object type "sound of human handclap" are different.

For example, in a case where the definitions of the image object, the sound object, and the sound image object are the same, the sound image object detector 53 may sum the existence probability $p_i^V$ of the image object and the identification probability $p_i^A$ of the sound object ($\mathrm{argmax}_i(p_iA\ p_i^{g'})$) and the maximum value ($\mathrm{argmax}_i(\{p_iA, p_iv\})$) may be used to determine the type of the sound image object.

Note that in a case where the definitions of the image object and the sound object are different, it is only required to determine the type of the sound image object after converting the type of one of the image object and the sound object to the type of the other by using a conversion table.

Specifically, for example, when the type of image object is "person" and the type of sound object is "sound of human handclap", for example, the type of sound object "sound of human handclap" is changed to "person".

Note that the conversion table may be manually determined in advance according to an intended use, or may be automatically generated by clustering the co-occurrence probabilities on the basis of the data for associating the types of the image object and the sound object, or the like.

Once the sound image object is detected by the above processing and the type of the sound image object is determined, the sound image object detector 53 outputs the sound image object information as the detection result of the sound image object, that is, the extraction result of the sound image object.

As described above, the sound image object information includes, for example, the type information indicating the type of the sound image object, the image area information of the sound image object, and the separated sound of the sound image object. Note that the image area information may also include, for example, information indicating the position of the image area, that is, the position of the sound image object on the moving image with sound.

Subsequently, selection of the sound image object by the sound image object selection unit 22 and the process based on the sound image object by the moving image processing unit 23 will be described.

The sound image object selection unit 22 selects the sound image object as the target of a zoom process, the focus process, the notification process, or the like for the sound image object on the basis of the sound image object information supplied from the sound image object detector 53. Note that selection of the sound image object may be performed manually by the user, or may be performed automatically by the sound image object selection unit 22.

For example, in a case where the user manually selects the sound image object, the user operates the input unit 24 while looking at the display image displayed on the display unit 27, and selects (specifies) the desired sound image object from the display image.

Figure 4:
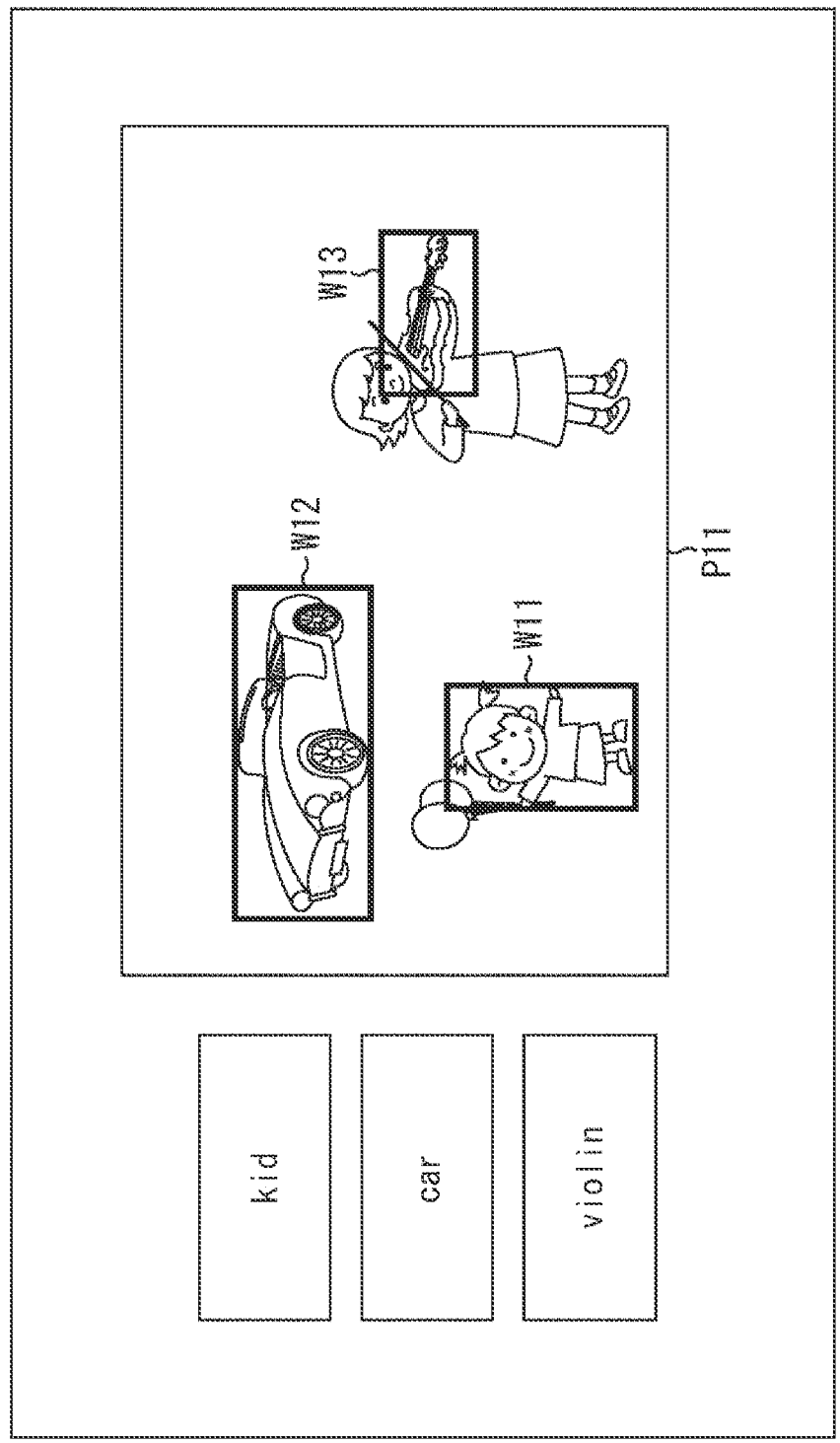
FIG. 4 is a diagram describing selection of a sound image object.

Specifically, for example, it is assumed that the display image illustrated in FIG. 4 is displayed on the display unit 27. In this example, the moving image with sound P11 is displayed on the display image, and rectangular frames W11 to W13 indicating respective positions of children, a car, and a violin as sound image objects are displayed on the moving image with sound P11.

Furthermore, in the diagram of the moving image with sound P11 in the display image, the characters "kid", "car", and "violin" indicating the sound image objects displayed at the respective positions of the frames W11 to W13 on the left side. That is, the characters indicating these sound image objects form an object list in which sound image objects can be selected on an object basis.

In this case, the user operates the input unit 24 to select a desired sound image object from the object list. Then, the sound image object selection unit 22 selects the sound image object selected by the user from the sound image objects indicated by the sound image object information, on the basis of the signal supplied from the input unit 24 in response to the operation by the user.

In addition, for example, the user may input a sound image object and a voice that specifies processing for the sound image object, such as "zoom in on violin" as sound to the microphone as the input unit 24. In this case, for example, the input unit 24 performs voice recognition on the voice picked up by the microphone, and supplies a voice recognition result to the sound image object selection unit 22. Then, the sound image object selection unit 22 selects "violin" as the sound image object on the basis of a recognition result supplied from the input unit 24.

Furthermore, in a case where the user automatically selects on the sound image object selection unit 22 side without performing a selection operation, for example, the input unit 24 or the like detects the line-of-sight of the user, and a detection result thereof is supplied to the sound image object selection unit 22. Then, the sound image object selection unit 22 selects the sound image object that the user is gazing at on the basis of the supplied detection result of the line-of-sight. Moreover, for example, it may be configured to select a pre-registered sound image object on the basis of the sound image object information.

The moving image processing unit 23 performs various processing on, for example, the moving image with sound on the basis of the selection result of the sound image object supplied from the sound image object selection unit 22.

For example, in a case where the zoom process is performed, on the basis of the sound image object information of the sound image object selected by the sound image object selection unit 22, the moving image processing unit 23 clips out and enlarges an image area centered on the selected sound image object from the supplied moving image with sound, to thereby generate an enlarged image. At this time, the image area information may be used to generate the enlarged image.

Furthermore, on the basis of the sound image object information of the sound image object selected by the sound image object selection unit 22, the moving image processing unit 23 causes the volume of sound of the selected sound image object to increase relatively, or causes only the sound of the selected sound image object to be reproduced. Moreover, the sound image of the sound of the selected sound image object may be localized at an appropriate position according to the enlarged image.

For example, in a case where the volume of sound of the selected sound image object is increased, it is only required to appropriately amplify (adjust gain) the separated sound of the selected sound image object, and add the separated sound after amplification to the sound of the moving image with sound. Furthermore, in a case where only the sound of the selected sound image object is reproduced, the separated sound is used as the reproduction sound.

Moreover, for example, in a case where the localization position of the sound image is rearranged, the localization of the sound image is adjusted by using intensity stereo, binaural reproduction using head-related transfer function, wave field synthesis, or the like according to the position of the sound image object.

Furthermore, in a case where the focus process is performed, when the moving image with sound is a moving image taken by the light field camera, the moving image processing unit 23 performs image synthesis on the basis of an image group as the moving image with sound, to thereby generate a moving image focused on the selected sound image object as a moving image with sound after the focus process.

In addition, in a case where the moving image with sound is a normal moving image that is not taken by the light field camera, the moving image processing unit 23 can perform a blurring process or the like on one other than the selected sound image object among the sound image objects on the moving image with sound, so that the selected sound image object is focused.

Furthermore, in a case where the focus process is performed, the volume of sound of the selected sound image object may be relatively increased, or a sound other than the sound of the selected sound image object may be subjected to a voice blur process, as in the case of the zoom process.

Moreover, in a case where a notification process related to the sound image object is performed, for example, the moving image processing unit 23 performs the emphasis process on the moving image with sound on the basis of the sound image object information so that a bounding box (frame) or the like is displayed in the area of the selected sound image object to emphasize the sound image object. Thus, it is possible to notify (present) the user of which sound image object is selected.

Furthermore, for example, in a case where a VR image is displayed as the display image, when the selected sound image object is out of the field of view of the user, that is, when the selected sound image object is outside the display image, a process of processing the moving image with sound so that an arrow or the like indicating the direction in which the selected sound image object is present is displayed on the display image may be performed as a notification process. Moreover, in this case, the moving image processing unit 23 may perform signal processing on the sound of the moving image with sound so that the separated sound of the selected sound image object is emphasized and reproduced in binaural reproduction. By these processes, it is possible to notify the user of existence of the sound image object that may be of interest to the user.

Moreover, in a case where a normal moving image or an AR image is displayed as the display image, a process of removing the selected sound image object from the moving image with sound to be used to generate the display image, so as to remove (delete) the sound of the selected sound image object, may be performed as the removal process.

Specifically, for example, it is assumed that one desires to erase a person who is a selected sound image object from a scenery in a city as a subject on the moving image with sound, so as to obtain an image of the scenery of the city without people. In such a case, the moving image processing unit 23 removes (erases) the sound image object selected from the moving image with sound, and performs a complementary process using a technique such as inpainting, so as to add an image of the scenery of city to the area of the removed sound image object.

Note that the inpainting is described specifically in, for example, "A study on effect of automatic perspective correction on exemplar-based image inpainting", ITE Trans. on Media Technology and Applications, Vol. 4, No. 1, January 2016, or the like.

Furthermore, as for the sound, the moving image processing unit 23 can process a sound so that any sound other than the separated sound is output by removing only the separated sound from the sound of the moving image with sound on the basis of the separated sound of the selected sound image object and the sound of the moving image with sound. In this case, for example, by adding the phase-inverted separated sound to the sound of the moving image with sound, only the separated sound is removed from the sound of the moving image with sound. Thus, for example, it is possible to remove only a human voice while leaving sounds of the scenery such as chirping of birds, murmuring of a river, and sound of the wind.

Moreover, for example, depending on detection and selection of the sound image object, it is possible to perform control to execute a specific process (action) other than the process for the moving image with sound and the sound thereof.

For example, in a case where the reproduction device 11 has an imaging function, when a specific sound image object is detected and selected by the sound image object selection unit 22, the moving image processing unit 23 may be configured to instruct an imaging unit that is not illustrated to capture a still image, that is, execution of shutter operation. In addition, for example, the moving image processing unit 23 may perform control of execution of a search process for the selected sound image object, or the like.

Explanation of Reproduction Process

Figure 5:
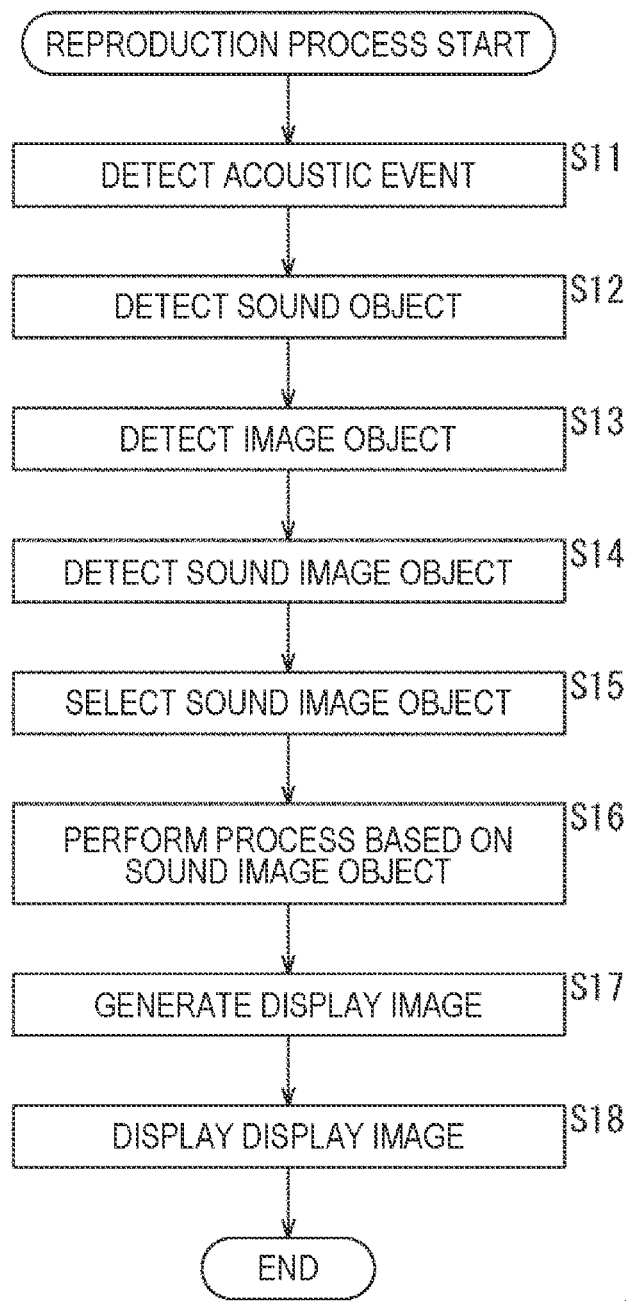
FIG. 5 is a flowchart describing a reproduction process.

Subsequently, a flow of processing performed by the reproduction device 11 will be described. That is, the reproduction process performed by the reproduction device 11 will be described below with reference to a flowchart of FIG. 5.

In step S11, the acoustic event detection unit 82 detects an acoustic event on the basis of sound of the moving image with sound supplied from the outside by appropriately using the detection result of the sound object supplied from the sound source separation unit 81.

For example, in step S11, the detection result of the sound object and the sound of the moving image with sound are input to the neural network constituting the acoustic event detection unit 82 and arithmetic processing is performed, so as to detect the acoustic event. The acoustic event detection unit 82 supplies acoustic event information obtained as the detection result of the acoustic event to the sound source separation unit 81 and the image object detector 51. Note that the detected acoustic event may be used as a sound object as it is.

In step S12, the sound source separation unit 81 detects the sound object on the basis of the sound of the externally supplied moving image with sound by appropriately using the acoustic event information supplied from the acoustic event detection unit 82, the detection result supplied from the image object detector 51, and the like, and supplies a detection result thereof to the acoustic event detection unit 82 and the sound image object detector 53. Note that the detection result of the sound object may be supplied to the image object detector 51.

For example, in step S12, the acoustic event information, the detection result of the image object, the image body recognition result by the image body recognizer, and the sound of the moving image with sound are input to the neural network constituting the sound source separation unit 81 and arithmetic processing is performed, so as to detect the sound object. At this time, candidates for sound objects may be narrowed down based on the above-mentioned object type, sound source position, image body position by image body recognition or the like, simultaneous occurrence probability, and the like.

In step S13, the image object detector 51 detects an image object on the basis of the moving image with sound supplied from the outside by appropriately using the acoustic event information supplied from the acoustic event detection unit 82 and the detection result of the sound object supplied from the sound source separation unit 81.

For example, in step S13, the acoustic event information, the detection result of the sound object, and the moving image with sound are input to the neural network constituting the image object detector 51 and arithmetic processing is performed, so as to detect the image object. The image object detector 51 supplies the detection result of the image object to the sound source separation unit 81 and the sound image object detector 53.

Note that more specifically, the above steps S11 to S13 are performed at the same time.

In step S14, the sound image object detector 53 detects the sound image object on the basis of the image object information which is the detection result of the image object supplied from the image object detector 51 and the sound object information which is the detection result of the sound object supplied from the sound source separation unit 81.

For example, in step S14, the image object information and the sound object information are input to the neural network constituting the sound image object detector 53 and arithmetic processing is performed. In the arithmetic processing, for example, association of the image object with the sound object with each other based on the co-occurrence probability is performed, and the type of the sound image object detected by the association is determined.

The sound image object detector 53 supplies the sound image object information obtained as the detection result of the sound image object to the sound image object selection unit 22, the moving image processing unit 23, and the memory 25.

In step S15, the sound image object selection unit 22 selects one or a plurality of sound image objects on the basis of the sound image object information supplied from the sound image object detector 53 according to the signal or the like supplied from the input unit 24, and then supplies a selection result thereof to the moving image processing unit 23.

In step S16, the moving image processing unit 23 performs a process based on the sound image object on the basis of the sound image object information supplied from the sound image object detector 53 and the moving image with sound supplied from the outside according to the signal supplied from the input unit 24 and the selection result supplied from the sound image object selection unit 22.

For example, in step S16, as the process based on the sound image object, the above-mentioned zoom process, focus process, notification process, removal process, and the like are performed on the moving image with sound and the sound of the moving image with sound, and the moving image with sound obtained as a processing result is supplied to the display image generation unit 26. In addition, the shutter operation control process or the like may be performed as the process based on the sound image object.

In step S17, the display image generation unit 26 generates a display image and a reproduction sound on the basis of the moving image with sound supplied from the moving image processing unit 23 according to the signal supplied from the input unit 24. At this time, the display image generation unit 26 generates a display image by appropriately using the sound image object information recorded in the memory 25.

For example, in a case where the display image is a VR image, the display image generation unit 26 clips out an area within the field of view of the user in the moving image with sound after the process based on the sound image object, which is supplied from the moving image processing unit 23, so as to use the clipped area as the display image, and the sound of the moving image with sound after the process based on the sound image object is used as the reproduction sound as it is.

In step S18, the display image generation unit 26 supplies the generated display image to the display unit 27 for display, supplies the reproduction sound to the speaker 28 to output the reproduction sound, and ends the reproduction process.

As described above, the reproduction device 11 detects the image object from the moving image with sound and detects the sound object, and detects the sound image object on the basis of detection results thereof. In this manner, a desired sound image object can be more reliably extracted from the moving image with sound.

<Use Case 1>

Here, a use case of the present technology will be described.

For example, the present technology can be used in a case of performing an object-based zoom process.

That is, in the present technology, it is possible to perform focus and zoom on an object basis by selecting the sound image object, instead of specifying a part of the area of the moving image with sound and performing the zoom process on a position basis.

Figure 6:
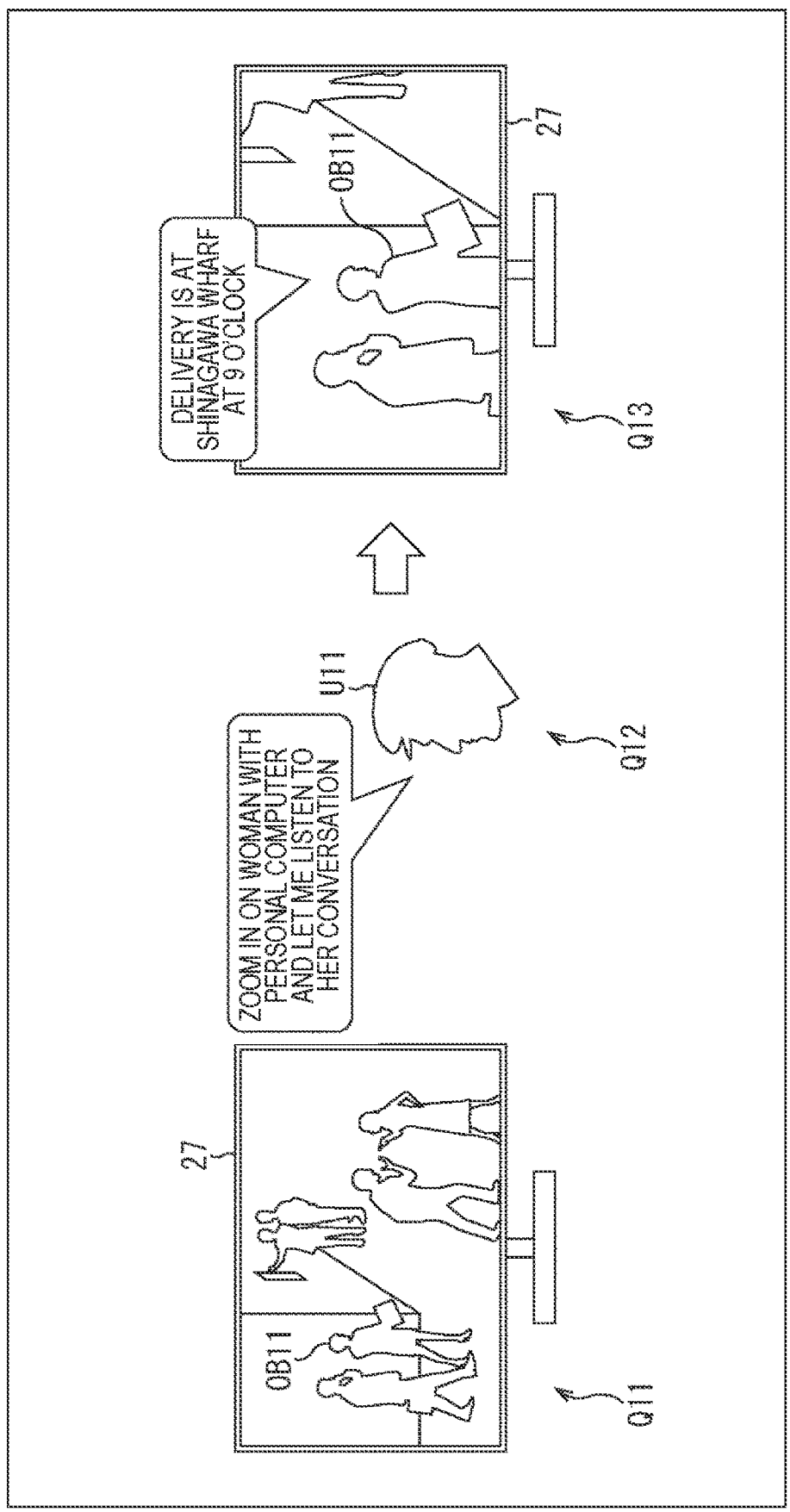
FIG. 6 is a diagram describing a use case of the present technology.

For example, it is assumed that, as indicated by arrow Q11 in FIG. 6, without any special processing on the moving image with sound that is captured by a surveillance camera or the like, the moving image with sound and the sound thereof are reproduced as they are by the display unit 27 and the speaker 28, respectively, as the display image and the reproduction sound.

In the example illustrated in FIG. 6, the display image displayed on the display unit 27 is illustrated in the part indicated by arrow Q11, and the display image includes a woman possessing a personal computer as a sound image object OB11.

In such a state, it is assumed that the user U11 viewing the displayed image inputs a voice "zoom in on a woman with a personal computer and let me listen to her conversation" to the microphone as the input unit 24 as indicated by arrow Q12. In this case, the input unit 24 supplies a signal indicating a result of voice recognition for the input voice, or the like to the sound image object selection unit 22 and the moving image processing unit 23.

Then, the sound image object selection unit 22 in response to a signal from the input unit 24 selects the sound image object OB11 that is "woman with a personal computer" specified by the user U11 from among the sound image objects detected from the moving image with sound.

Then, in the moving image processing unit 23, the image of the area around the selected sound image object OB11 in the moving image with sound is supplied to the display image generation unit 26, and the image of the area around the sound image object OB11 is displayed on the display unit 27 as a display image as indicated by arrow Q13.

Here, a process of generating an image of the area around the sound image object OB11 is performed as the zoom process by the moving image processing unit 23. Note that the image of the area around the sound image object OB11 may be the image area information itself included in the sound image object information of the sound image object OB11, or may be an image clipped out from the moving image with sound on the basis of the image area information or the like.

Furthermore, in the moving image processing unit 23, for example, a process of extracting only the sound of the sound image object OB11 and supplying the sound to the display image generation unit 26 is performed as the zoom process of sound. Here, for example, the separated sound included in the sound image object information of the sound image object OB11 is supplied to the display image generation unit 26 as it is, and this separated sound is output as the reproduction sound. In this example, "delivery is at the Shinagawa wharf at 9 o'clock" is reproduced as the reproduction sound as the sound of the sound image object OB11.

As described above, in the present technology, it is possible to specify the sound image object as a target in units of objects by voice input (voice command), and execute the zoom process of image and sound.

<Use Case 2>

Furthermore, the present technology can also be used for reproducing 360-degree omnidirectional moving images and reproducing images such as VR.

Figure 7:
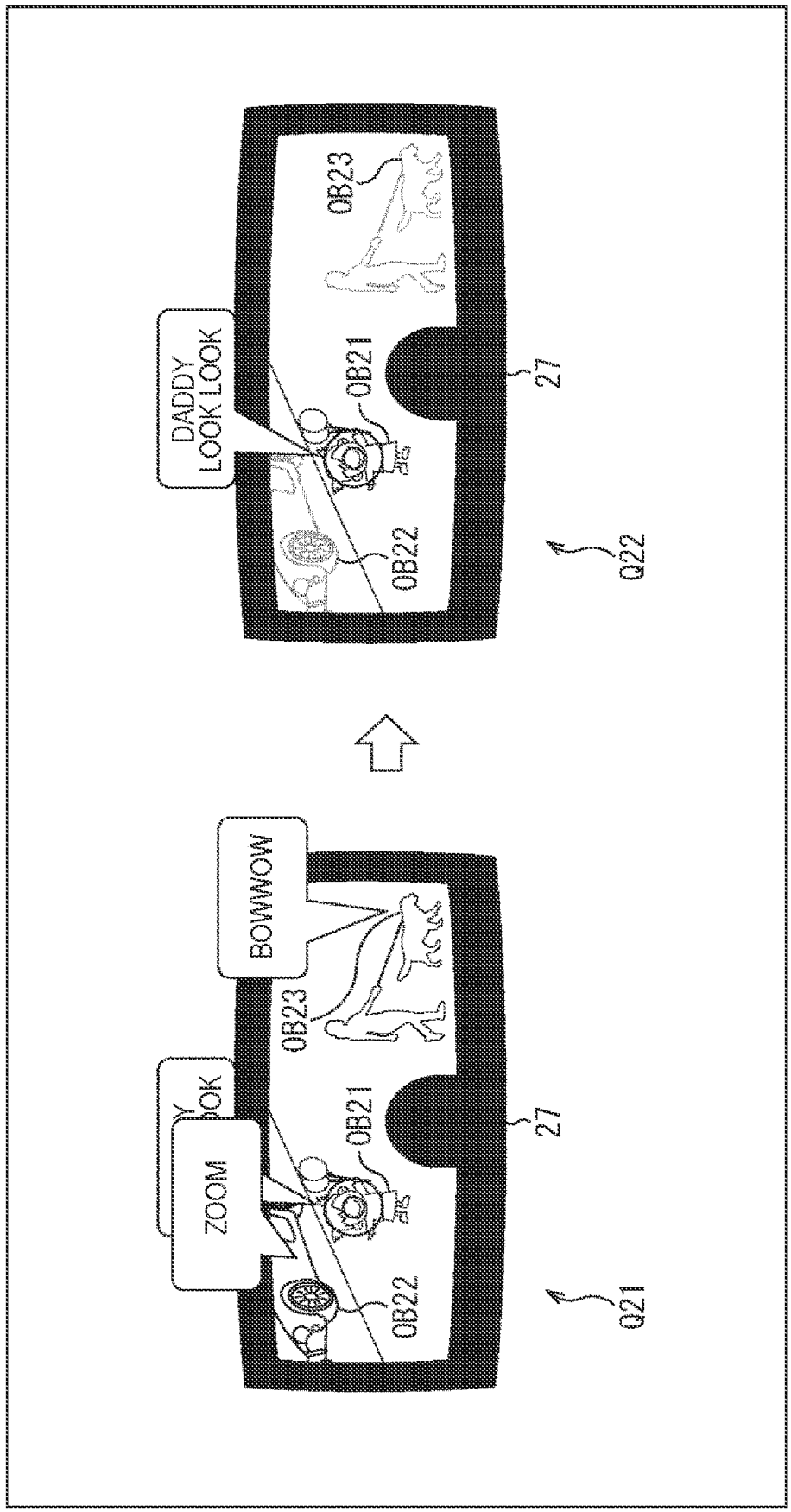
FIG. 7 is a diagram describing a use case of the present technology.

Specifically, for example, the object that the user gazes at in the VR image can be focused and sound of the object can be emphasized as illustrated in FIG. 7.

In the example illustrated in FIG. 7, for example, the moving image with sound is displayed as a display image as it is on the display unit 27 of a head-mounted display as indicated by arrow Q21.

Here, the display image (moving image with sound) includes the sound image object OB21 that is a little girl who the user is gazing at, the sound image object OB22 that is a car, and the sound image object OB23 that is a dog as sound image objects. Furthermore, a sound "daddy, look look" of the sound image object OB21 is reproduced, but this sound is drowned out in a sound "zoom" of the sound image object OB22 that is the car and a bark "bowwow" of the sound image object OB23 that is the dog.

In this case, it is assumed that a signal indicating the gaze direction of the user is supplied from the input unit 24 to the sound image object selection unit 22, and the sound image object OB21 that is the little girl is selected by the sound image object selection unit 22. Then, the moving image processing unit 23 performs the focus process on the girl.

That is, for example, the moving image processing unit 23 performs the blurring process on the areas of the car and the dog in the moving image with sound, that is, the areas of the sound image object OB22 and the sound image object OB23 on the basis of the sound image object information supplied from the sound image object detector 53, thereby performing the focus process to relatively focus on the sound image object OB21.

Furthermore, the moving image processing unit 23 extracts, for the sound of the moving image with sound, only the sound of the sound image object OB21 by outputting only the separated sound of the sound image object OB21 to the display image generation unit 26 in the subsequent stage, that is, performs the focus process to focus on the voice of the girl.

Thus, on the display unit 27, for example, the sound image object OB22 that is the car and the sound image object OB23 that is the dog are blurred as indicated by arrow Q22, and the focus is on the sound image object OB21 that is the girl who the user is gazing at. Furthermore, in this case, only the sound "daddy, look look" of the sound image object OB21 is reproduced as the reproduction sound as the sound.

Furthermore, besides the example illustrated in FIG. 7, for example, the display image generation unit 26 may generate a list of sound image objects detected from the moving image with sound on the basis of the detection result of the sound image objects held in the memory 25, and perform control to display the list on the display unit 27. In this case, the user can operate the input unit 24 to select a desired sound image object from the displayed list.

Then, for example, in the moving image processing unit 23, the moving image focused on the selected sound image object can be generated as the moving image with sound after the focus process by performing image synthesis on the basis of the image group as the moving image with sound taken by the light field camera. In this example, the user can select and focus the desired sound image object with a more intuitive operation.

Use Case 3

Further, the present technology can also be used for moving image search in, for example, a home agent, a robot, an action camera, or the like with an imaging function.

That is, for example, from among moving images taken and stored by the user without paying special attention, it becomes possible to search for a moving image or a scene that satisfies predetermined conditions for moving images (videos) and sounds, such as "video of Mr. A playing the guitar" and "video of a dog singing with its owner".

Figure 8:
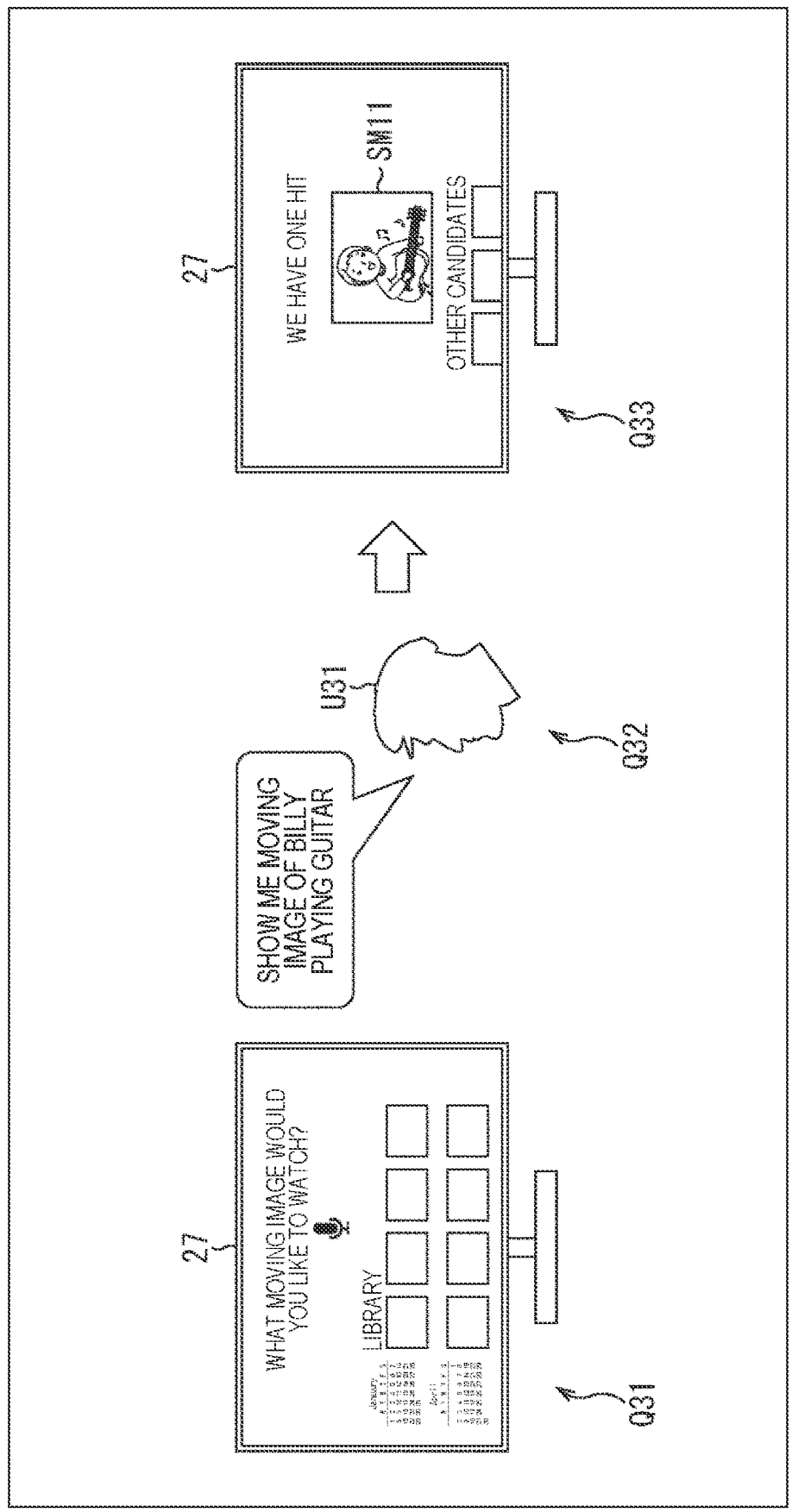
FIG. 8 is a diagram describing a use case of the present technology.

As a specific example, for example, as indicated by arrow Q31 in FIG. 8, it is assumed that the display unit 27 displays a list of moving images with sound recorded in a recording unit (not illustrated). Here, a text "what moving image would you like to watch?" is displayed along with the list to prompt a search for moving image with sound.

It is assumed that a user U31 who sees such a list inputs a voice "show me a moving image of Billy playing the guitar" to the microphone as the input unit 24 as indicated by arrow Q32, for example. In this case, the input unit 24 supplies a signal indicating a result of voice recognition for the input voice, or the like to the sound image object selection unit 22 and the moving image processing unit 23.

Then, the sound image object extraction unit 21 performs detection of the sound image object by targeting all the moving images with sound recorded in the recording unit. Then, the sound image object selection unit 22 selects a sound image object having image area information and separated sound of the specified person "Billy", and a sound image object having image area information and separated sound of the guitar that is the specified instrument on the basis of the signal supplied from the input unit 24, and supplies a selection result thereof to the moving image processing unit 23.

The moving image processing unit 23 selects a moving image with sound satisfying the conditions specified by the user U31 from among the moving images with sound, that is, a moving image with sound in which "Billy" and "guitar" are detected as sound image objects on the basis of the selection result supplied from the sound image object selection unit 22, and supplies the selected moving image with sound to the display image generation unit 26. At this time, the moving image with sound in which only one of "Billy" and "guitar" is detected as the sound image objects may be supplied as the moving image with sound as another candidate to the display image generation unit 26.

Thus, the display unit 27 displays as a search result, for example, a screen displaying a thumbnail SM11 of the moving image with sound in which "Billy" and "guitar" are detected as the sound image objects and thumbnails of moving images with sound as other candidates as indicated by arrow Q33.

Use Case 4

Furthermore, the present technology can also be used, for example, in a case of notifying the user of presence of a noteworthy object outside the field of view of the user when viewing a 360-degree omnidirectional moving image in VR, and the like. This makes it possible to, for example, prevent the user from overlooking a scene that may be of interest to the user, or the like.

Figure 9:
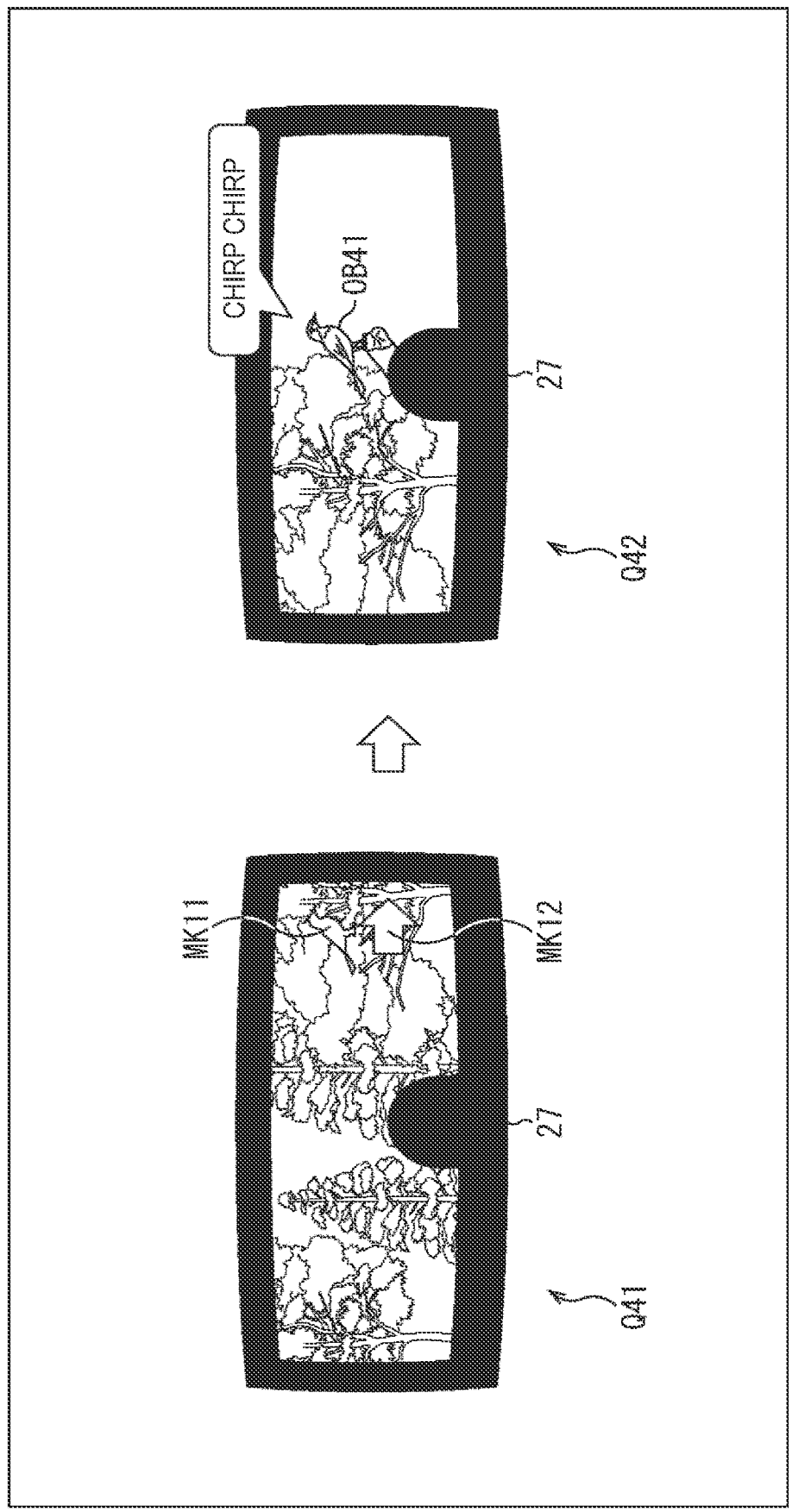
FIG. 9 is a diagram describing a use case of the present technology.

Specifically, for example, it is assumed that a predetermined visual field area in the moving image with sound is displayed as the display image on the display unit 27 of the head-mounted display as indicated by arrow Q41 in FIG. 9. Furthermore, at this time, it is assumed that a bird that the user may be interested in is detected as the sound image object OB41 from the moving image with sound, but the sound image object OB41 is out of the field of view at the present time.

In such a case, for example, if the sound image object OB41 is selected in the sound image object selection unit 22, the moving image processing unit 23 performs a superimposition process of superimposing a mark MK11 representing the sound image object OB41 and an arrow mark MK12 indicating the direction in which the sound image object OB41 is located on the moving image with sound with respect to the area of the current field of view of the moving image with sound. Here, such a superimposition process is performed as a notification process for notifying the user of existence of the sound image object OB41 and direction of the sound image object OB41.

Thereafter, for example, if the user visually recognizes the mark MK11 and the arrow mark MK12 and directs the line-of-sight in the direction indicated by the arrow mark MK12, the display of the display unit 27 changes as indicated by arrow Q42, the sound image object OB41 as a bird is displayed on the display image, and the separated sound "chirp chirp" of the sound image object OB41 is reproduced as a reproduction sound.

Use Case 5

Moreover, the present technology can also be used in a case of performing a removal process, for example, it is possible to remove an image and sound of an arbitrary object from a moving image of a scenery such as nature or a city, and thereby generate a moving image as if the object did not exist.

Figure 10:
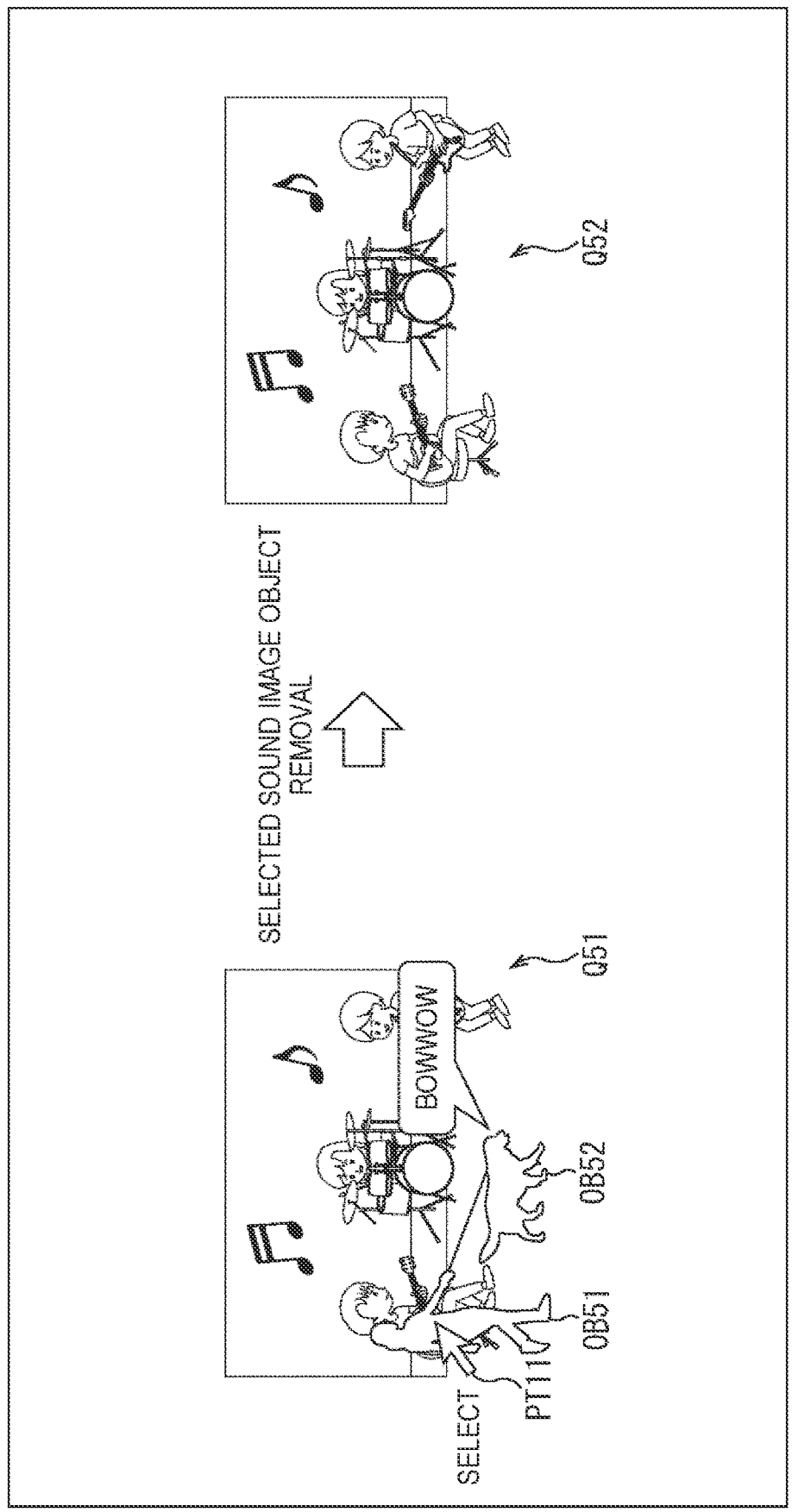
FIG. 10 is a diagram describing a use case of the present technology.

Specifically, for example, as indicated by arrow Q51 in FIG. 10, it is assumed that the display unit 27 includes the sound image object OB51 and the sound image object OB52 that are a walking person and a dog, respectively. Furthermore, it is also assumed that the bark "bowwow" of the sound image object OB52 that is the dog is also reproduced as a reproduction sound.

At this time, it is assumed that, for example, the user operates the input unit 24 to move a pointer PT11 displayed on the display image and select the sound image object OB51 and the sound image object OB52, and then give an instruction on deletion of those sound image objects. In this case, the sound image object selection unit 22 selects the sound image object OB51 and the sound image object OB52 according to the signal supplied from the input unit 24, and supplies a selection result thereof to the moving image processing unit 23.

Then, the moving image processing unit 23 removes the areas of the sound image object OB51 and the sound image object OB52 from the moving image with sound, and performs an image complementation process using the technique such as inpainting on those areas. Furthermore, the moving image processing unit 23 adds the sound of opposite phase of a separated sound of the sound image object OB52 to the sound of the moving image with sound, to thereby remove the sound of the sound image object OB52 from the sound of the moving image with sound.

Consequently, for example, the image in which the sound image object OB51 and the sound image object OB52 are removed from the original moving image with sound is displayed as the display image as indicated by arrow Q52, and the sound of the sound image object OB52 that has been reproduced can no longer be heard. That is, the display image is displayed as if there were no person and dog taking a walk.

Use Case 6

In addition, the present technology can also be used to control execution of shutter operation.

For example, if the present technology is used to control execution of shutter operation, it becomes possible to release the shutter without missing a decisive moment without depending on ambient noise or sound of unintended objects, such as when a specific person raises a specific voice or when a specific dog barks.

Figure 11:
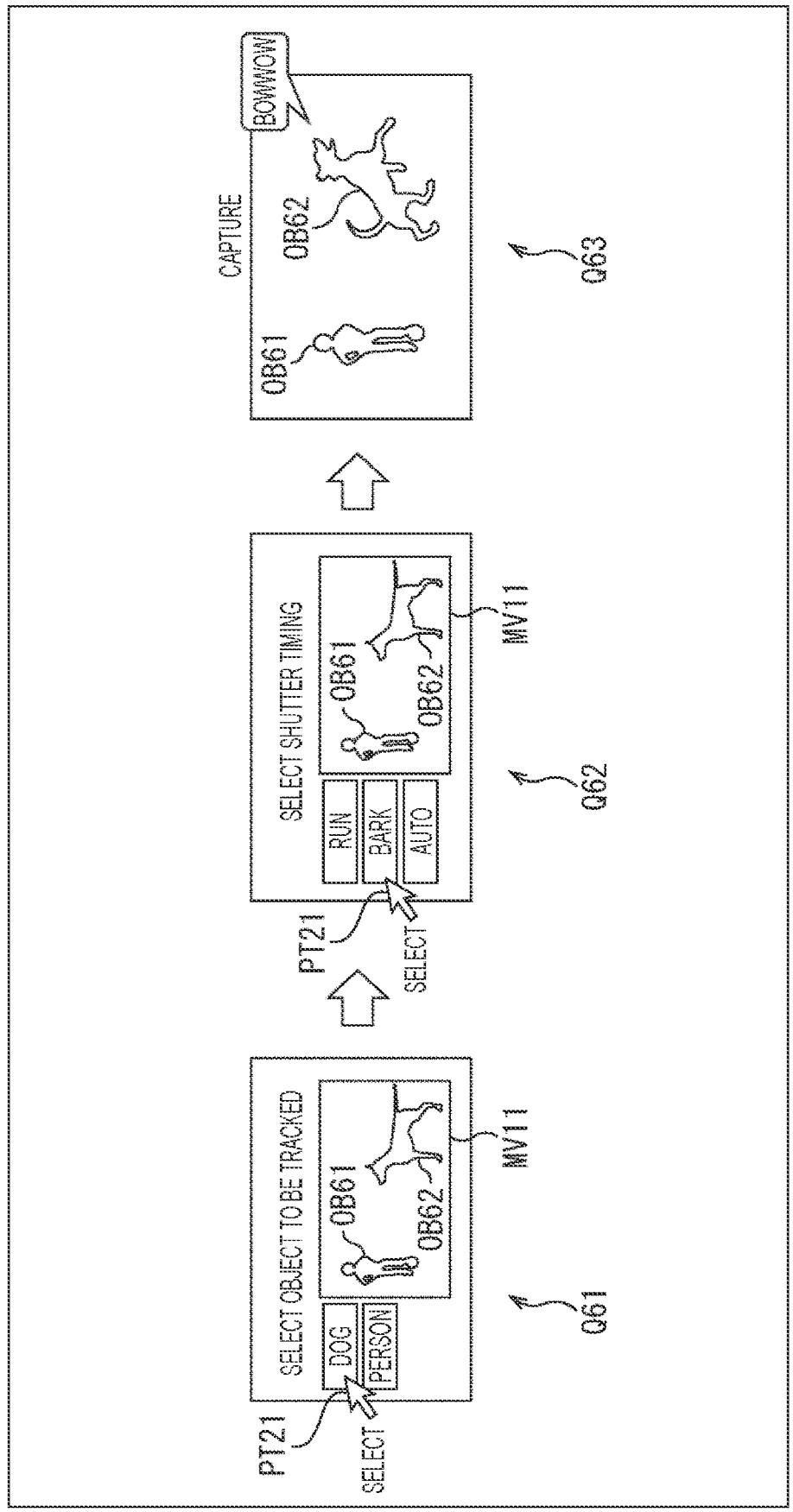
FIG. 11 is a diagram describing a use case of the present technology.

Specifically, for example, it is assumed that the display image generation unit 26 of a camera or the like having an imaging function causes a display image indicated by arrow Q61 in FIG. 11 to be displayed on the display unit 27.

Here, the display image indicated by arrow Q61 includes an area where a through image MV11 as the moving image with sound is displayed, in which a sound image object OB61 that is a person and a sound image object OB62 that is a dog are present as subjects, and an area where a list of sound image objects detected from the through image MV11 is displayed.

For example, the list of sound image objects is generated by the display image generation unit 26 on the basis of the sound image object information held in the memory 25, and here, the list describes the "dog" and "person" detected as the sound image objects.

In such a state, it is assumed that the user operates the input unit 24 to move the pointer PT21 on the display image and selects the "dog" from the list of sound image objects. Thus, the sound image object OB62 to be tracked for the shutter operation is selected from the sound image objects on the through image MV11.

Then, the display image generation unit 26 generates a list of operations to be a trigger for the shutter operation for the sound image object OB62 to be tracked selected by the user, in order to allow selecting the timing for performing the shutter operation, and performs control to display the list on the display image, as indicated by arrow Q62. Here, "run", "bark", and "auto" are displayed as actions to be the trigger.

For example, if the "run" is selected as the trigger, the moving image processing unit 23 causes the shutter or the imaging element that is not illustrated to operate at a timing when running of the sound image object OB62 that is the dog is detected on the basis of time-series sound image object information of the sound image object OB62 that is the dog, thereby allowing capturing a still image.

Furthermore, for example, if the "bark" is selected as the trigger, the moving image processing unit 23 causes the shutter or the imaging element that is not illustrated to operate at a timing when the bark of the sound image object OB62 that is the dog is detected on the basis of the sound image object information of the sound image object OB62 that is the dog, thereby allowing capturing a still image. Note that whether or not the dog has barked may be detected by voice recognition or the like for the separated sound, or may be identified from a detection result of a dog bark as the acoustic event in the acoustic event detection unit 82, or a detection result of a dog bark as the sound object in the sound source separation unit 81, for example.

Moreover, for example, if the "auto" is selected as the trigger, the moving image processing unit 23 causes the shutter or the imaging element that is not illustrated to operate at an appropriate timing when a condition determined in advance are satisfied, such as a timing when the dog is stationary, on the basis of the sound image object information of the sound image object OB62 that is the dog, thereby allowing capturing a still image.

In the example indicated by arrow Q62, the "bark" is selected as the trigger as indicated by arrow Q63, a still image is captured at a timing when the dog bark "bowwow" is detected as the separated sound of the sound image object OB62 that is the dog.

For example, if the sound image object is detected, the shutter operation can be performed when a specific object emits a specific sound, such as the dog bark. In particular, even in a case where there is a plurality of sound sources in the same direction or a case where a plurality of sound sources of the same type exists, it is possible to accurately identify the timing when the specific object emits the specific sound.

(Configuration Example of Computer)

Incidentally, the series of processes described above can be executed by hardware, and can also be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 12:
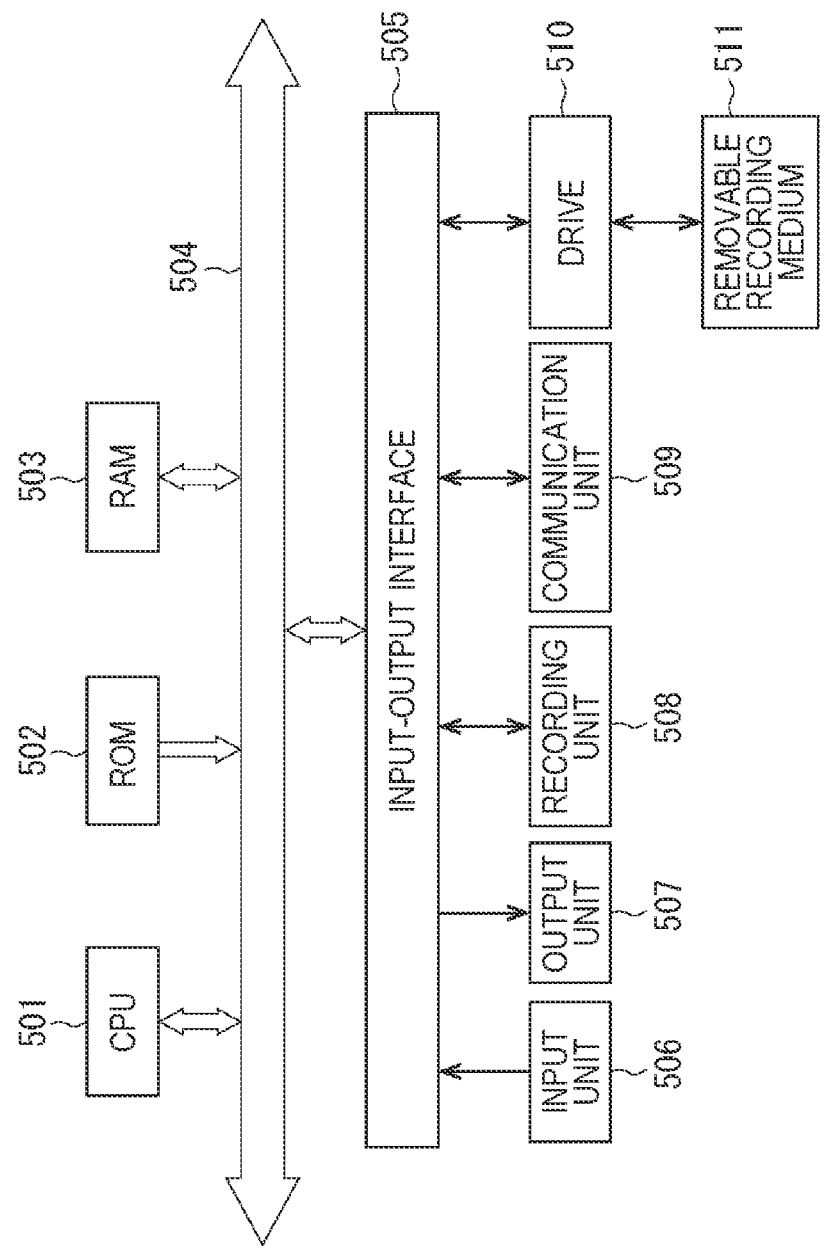
FIG. 12 is a block diagram illustrating a main configuration example of a computer.

FIG. 12 is a block diagram illustrating a configuration example of hardware of a computer that executes the above-described series of processes by a program.

In the computer, a central processing unit (CPU) 501, a read only memory (ROM) 502, and a random access memory (RAM) 503 are interconnected via a bus 504.

An input-output interface 505 is further connected to the bus 504. An input unit 506, an output unit 507, a recording unit 508, a communication unit 509, and a drive 510 are connected to the input-output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, the CPU 501 loads, for example, a program recorded in the recording unit 508 into the RAM 503 via the input-output interface 505 and the bus 504, and executes the program, so as to perform the above-described series of processes.

The program executed by the computer (CPU 501) can be provided by being recorded on, for example, a removable recording medium 511 as a package medium or the like. Furthermore, the program can be provided via a wired or wireless transmission medium such as a local area network, the Internet, or digital satellite broadcasting.

In the computer, the program can be installed in the recording unit 508 via the input-output interface 505 by mounting the removable recording medium 511 to the drive 510. Furthermore, the program can be received by the communication unit 509 via a wired or wireless transmission medium and installed in the recording unit 508. In addition, the program can be installed in the ROM 502 or the recording unit 508 in advance.

Note that the program executed by the computer may be a program for processing in time series in the order described in the present description, or a program for processing in parallel or at a necessary timing such as when a call is made.

Furthermore, the embodiments of the present technology are not limited to the above-described embodiments, and various modifications are possible without departing from the scope of the present technology.

For example, the present technology can take a configuration of cloud computing in which one function is shared by a plurality of devices via a network and processed jointly.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

Moreover, the present technology can also have the following configurations.

(1)

An information processing device including:

an image object detection unit that detects an image object on the basis of a moving image with sound;

a sound object detection unit that detects a sound object on the basis of the moving image with sound; and a sound image object detection unit that detects a sound image object on the basis of a detection result of the image object and a detection result of the sound object.

(2)

The information processing device according to (1), in which the sound image object detection unit outputs image area information of the sound image object that is detected and sound image object information including separated sound.

(3)

The information processing device according to (1) or (2), in which the sound image object detection unit detects the sound image object by associating the image object with the sound object.

(4)

The information processing device according to any one of (1) to (3), in which the sound image object detection unit detects the sound image object on the basis of a co-occurrence probability of the image object and the sound object.

(5)

The information processing device according to any one of (1) to (4), in which the sound image object detection unit detects the sound image object on the basis of the position information of the image object and the position information of the sound object.

(6)

The information processing device according to any one of (1) to (5), in which the image object detection unit detects the image object on the basis of at least one of a sound constituting the moving image with sound, a detection result of an acoustic event from the sound constituting the moving image with sound, or a detection result of the sound object, and a moving image constituting the moving image with sound.

(7)

The information processing device according to any one of (1) to (6), in which the sound object detection unit detects the sound object on the basis of at least one of a moving image constituting the moving image with sound, a result of image body recognition for the moving image constituting the moving image with sound, or a detection result of the image object, and a sound constituting the moving image with sound.

(8)

The information processing device according to any one of (1) to (7), in which on the basis of at least one of a simultaneous occurrence probability of a plurality of the sound objects, a sound source position, an image body position, or a type of the sound object, the sound object detection unit narrows down the sound objects as detection targets.

(9)

The information processing device according to any one of (1) to (8), in which the sound object detection unit detects the sound object by detecting an acoustic event.

(10)

The information processing device according to any one of (1) to (9), in which the sound object detection unit detects the sound object by sound source separation.

(11)

The information processing device according to any one of (1) to (10), further including a sound image object selection unit that selects one or a plurality of the sound image objects from among a detected plurality of the sound image objects.

(12)

The information processing device according to (11), further including a processing unit that executes a process according to a selection result of the sound image object by the sound image object selection unit.

(13)

The information processing device according to (12), in which the processing unit executes, as the process according to the selection result:

a zoom process on the sound image object that is selected of the moving image with sound, a focus process on the sound image object that is selected of the moving image with sound, a removal process of the sound image object that is selected from the moving image with sound, a notification process with respect to the sound image object that is selected, a search process for the sound image object that is selected, or a shutter operation control process based on the sound image object that is selected.

(14) An information processing method including, by an information processing device:

detecting an image object on the basis of a moving image with sound;

detecting a sound object on the basis of the moving image with sound; and detecting a sound image object on the basis of a detection result of the image object and a detection result of the sound object.

(15) A program that causes a computer to perform a process, the process including the steps of:

detecting an image object on the basis of a moving image with sound;

detecting a sound object on the basis of the moving image with sound; and detecting a sound image object on the basis of a detection result of the image object and a detection result of the sound object.

REFERENCE SIGNS LIST

11 Reproduction device
21 Sound image object extraction unit
22 Sound image object selection unit
23 Moving image processing unit
24 Input unit
26 Display image generation unit
51 Image object detector
52 Sound object detector
53 Sound image object detector

The invention claimed is:

1. An information processing device, comprising:
   an image object detection unit configured to:
      receive a moving image with sound; and
      detect an image object based on the received moving image with sound;
   a sound object detection unit configured to:
      estimate a simultaneous occurrence probability of a plurality of sound objects based on the detection of the image object, wherein the plurality of sound objects is associated with the moving image with sound;
      determine a set of sound objects from the plurality of sound objects based on the estimated simultaneous occurrence probability of the plurality of sound objects; and
      detect a sound object from the determined set of sound objects based on a basis of the moving image with sound; and
   a sound image object detection unit configured to detect a sound image object based on a detection result of the detection of the image object and a detection result of the detection of the sound object.

2. The information processing device according to claim 1, wherein the sound object detection unit is further configured to extract a separated sound of the sound object from a sound of the moving image with sound, the sound image object detection unit is further configured to output image area information of the sound image object and sound image object information of the sound image object, and the sound image object information includes the separated sound of the sound object.

3. The information processing device according to claim 1, wherein the sound image object detection unit is further configured to:
   associate the image object with the sound object; and
   detect the sound image object based on the association of the image object with the sound object.

4. The information processing device according to claim 1, wherein the sound image object detection unit is further configured to detect the sound image object based on a co-occurrence probability of the image object and the sound object.

5. The information processing device according to claim 1, wherein the sound image object detection unit is further configured to detect the sound image object based on position information of the image object and position information of the sound object.

6. The information processing device according to claim 1, wherein the image object detection unit is further configured to detect the image object based on a basis of at least one of a sound constituting the moving image with sound, a detection result of an acoustic event from the sound constituting the moving image with sound, or the detection result of the detection of the sound object, and a moving image constituting the moving image with sound.

7. The information processing device according to claim 1, wherein the sound object detection unit is further configured to detect the sound object based on at least one of a moving image constituting the moving image with sound, a result of image body recognition for the moving image constituting the moving image with sound, or the detection result of the detection of the image object, and a sound constituting the moving image with sound.

8. The information processing device according to claim 1, wherein the sound object detection unit is further configured to determine the set of sound objects based on at least one of a sound source position of a sound source, an image body position of the image object, or a type of the sound object.

9. The information processing device according to claim 1, wherein the sound object detection unit is further configured to:
   detect an acoustic event based on the moving image with sound; and
   detect the sound object based on the detection of the acoustic event.

10. The information processing device according to claim 1, wherein the sound object detection unit is further configured to execute a sound source separation process to detect the sound object.

11. The information processing device according to claim 1, further comprising a sound image object selection unit configured to:
   receive information of a plurality of sound image objects including the sound image object; and
   select, based on the received information, at least one sound image object from the plurality of the sound image objects.

12. The information processing device according to claim 11, further comprising a processing unit configured to:
    receive a selection result of the selection of the at least one sound image object; and
    execute a process based on the selection result.

13. The information processing device according to claim 12, wherein the processing unit is further configured to execute, as the process, at least one of:
    a zoom process on the selected at least one sound image object of the moving image with sound,
    a focus process on the selected at least one sound image object of the moving image with sound,
    a removal process of the selected at least one sound image object from the moving image with sound,
    a notification process with respect to the selected at least one sound image object,
    a search process for the selected at least one sound image object, or
    a shutter operation control process based on the selected at least one sound image object.

14. An information processing method, comprising:
    receiving a moving image with sound;
    detecting an image object based the received moving image with sound;
    estimating a simultaneous occurrence probability of a plurality of sound objects based on the detection of the image object, wherein the plurality of sound objects is associated with the moving image with sound;
    determining a set of sound objects from the plurality of sound objects based on the estimated simultaneous occurrence probability of the plurality of sound objects;
    detecting a sound object from the determined set of sound objects based on the moving image with sound; and
    detecting a sound image object based on a detection result of the detection of the image object and a detection result of the detection of the sound object.

15. A non-transitory computer-readable medium having stored thereon computer-executable instructions which, when executed by a processor, cause the processor to execute operations, the operations comprising:
    receiving a moving image with sound;
    detecting an image object based on the received moving image with sound;
    estimating a simultaneous occurrence probability of a plurality of sound objects based on the detection of the image object, wherein the plurality of sound objects is associated with the moving image with sound;
    determining a set of sound objects from the plurality of sound objects based on the estimated simultaneous occurrence probability of the plurality of sound objects;
    detecting a sound object from the determined set of sound objects based on the moving image with sound; and
    detecting a sound image object based on detection result of the detection of the image object and a detection result of the detection of the sound object.

* * * * *